United States Patent [19]

Sorenson

[11] Patent Number: 5,641,140
[45] Date of Patent: Jun. 24, 1997

[54] ADHERING STRUCTURES FOR THE PURPOSE OF EMPLOYING THE FORCES OF INTERMOLECULAR ATTRACTION IN LIQUIDS TO CONTROLLABLY AND REMOVABLY ADHERE ONE MANUFACTURED OBJECT TO ANOTHER

[76] Inventor: Roger A. Sorenson, 6707 Connecticut Ave., Chevy Chase, Md. 20815

[21] Appl. No.: 402,882

[22] Filed: Mar. 10, 1995

[51] Int. Cl.$^6$ .................................................. A47G 29/00
[52] U.S. Cl. ................ 248/205.3; 248/310; 248/346.03; 248/349.1; 403/267
[58] Field of Search ............................ 248/205.3, 205.4, 248/205.5, 205.6, 206.5, 346.03, 346.11, 346.01, 154, 146, 506, 500, 311.2, 309.1, 309.4, 205.8, 349.1; 403/267, 268, 266, 265

[56] References Cited

U.S. PATENT DOCUMENTS

| | | | |
|---|---|---|---|
| 271,054 | 1/1883 | Fowler . | |
| 435,723 | 9/1890 | Barnes . | |
| 547,926 | 10/1895 | Kitson | 248/349.1 |
| 2,056,437 | 10/1936 | Ullman | 248/363 |
| 2,497,194 | 2/1950 | White | 248/311.2 |
| 2,563,698 | 8/1951 | Whitebread | 248/154 |
| 2,623,369 | 12/1952 | Haydu | 248/363 |
| 2,653,515 | 9/1953 | Stimson | 351/160 |
| 2,809,556 | 10/1957 | Hornstein | 351/160 |
| 2,850,079 | 9/1958 | Prushnok et al. | 248/310 |
| 3,004,745 | 9/1961 | Wilson . | |
| 3,139,032 | 6/1964 | Silverstein | 403/268 |
| 3,275,469 | 9/1966 | Streit | 156/247 |
| 3,365,160 | 1/1968 | Bickner | 248/349.1 |
| 3,455,531 | 7/1969 | Baker | 248/349.1 |
| 3,512,740 | 5/1970 | Podwalny | 248/310 |
| 3,666,588 | 5/1972 | Wanesky | 156/344 |
| 3,765,638 | 10/1973 | Harrison | 248/310 |
| 3,773,212 | 11/1973 | Sekuler | 220/83 |
| 4,338,151 | 7/1982 | Hutter, III | 248/205.3 |

(List continued on next page.)

OTHER PUBLICATIONS

"Properties of Idial and Actual Fluids", *Encyclopedia Britannica* 15th ed. (1986) vol. 23 Chicago pp. 862–863.

"Cohesion and Cohesion Hypothesis", *Encyclopedia Britannica*, 15 ed. (1986) vol. 3, Chicago, p. 435.

"Adhesion," *Van Nostrand's Scientific Encyclopedia*, 6th ed. New York, (1983) p. 37.

"Viscosity"! *Van Nostrand's Scientific Encyclopedia;* 6th ed. New York, (1983) p. 2939–2940.

*Primary Examiner*—Alvin C. Chin-Shue
*Assistant Examiner*—Anita M. King

[57] ABSTRACT

Reciprocally rotatable complementary surface adhering portions (34 and 44) are provided integral to each of two manufactured objects (30 and 40) to be rotatably adhered, such as a bowl and a holding base. Being complementary in rotation, these adhering portions mobilize the forces of intermolecular attraction in any smooth, viscous, continuously flowable, non-curing liquid (50) compressed into a liquid film (52) across their interface and are rotatable upon each other while adhered. Media for rotatably adhering comprise a variety of liquids, among which are common household products such as honey, syrup, liquid soap, and many other such viscous liquids. Depending upon the viscosity of the liquid employed, portions so adhered at normal room temperatures will temporarily resist a tensile force in excess of 0.454 kg (1 lb) per 6.55 cm$^2$ (1 inch$^2$) equivalent to a pull of 13.62 kg (30 lbs) on a bowl having a base adhering radius of 7.93 cm (3.125 inches). Parallel movement inhibiting abutment means (56 and 56') are provided for inhibiting parallel movement of either manufactured object away from the other, while, at the same time, permitting their rotation upon each other while adhered. Thus separation by application of shear force or by simply sliding them apart is estopped, which means that some application of tensile force is required to effect separation whereby unadhering is controlled. Since unadhering can only be effected by application of some degree of tensile force, grappling means (62 and 64) are provided in certain embodiments to facilitate prying structures apart.

15 Claims, 9 Drawing Sheets

U.S. PATENT DOCUMENTS

| | | | |
|---|---|---|---|
| 4,548,440 | 10/1985 | Meslin et al. | 297/174 |
| 4,678,150 | 7/1987 | Newman et al. | 248/205.3 |
| 4,821,931 | 4/1989 | Johnson | 224/42.42 |
| 4,908,066 | 3/1990 | Taylor et al. | 248/506 |
| 4,927,024 | 5/1990 | Lloyd | 206/562 |
| 4,928,876 | 5/1990 | Marshall | 229/103.1 |
| 4,942,071 | 7/1990 | Frye | 248/205.3 |
| 5,010,826 | 4/1991 | Kudlac | 108/25 |
| 5,180,132 | 1/1993 | Pearson et al. | 248/362 |
| 5,381,569 | 1/1995 | Church . | |
| 5,384,938 | 1/1995 | Frederick | 24/306 |

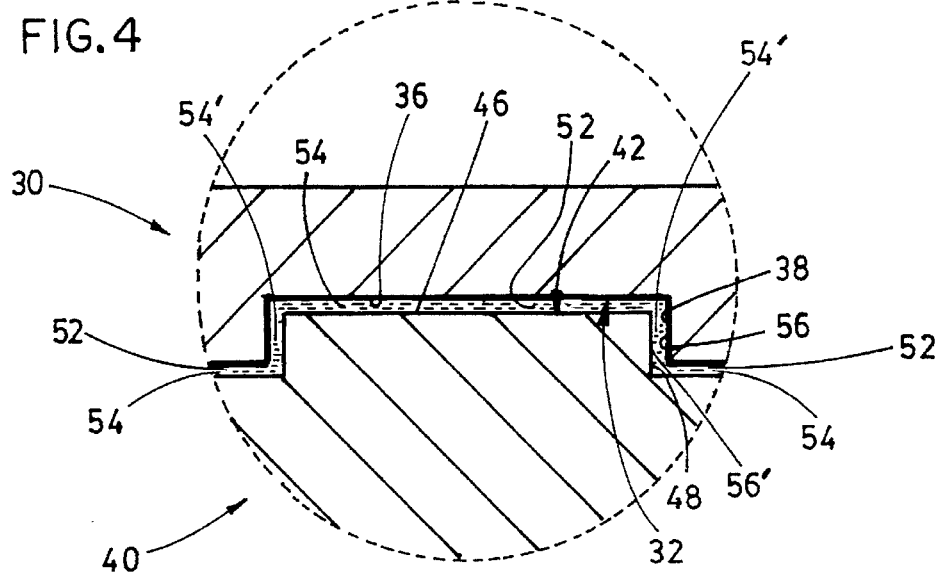
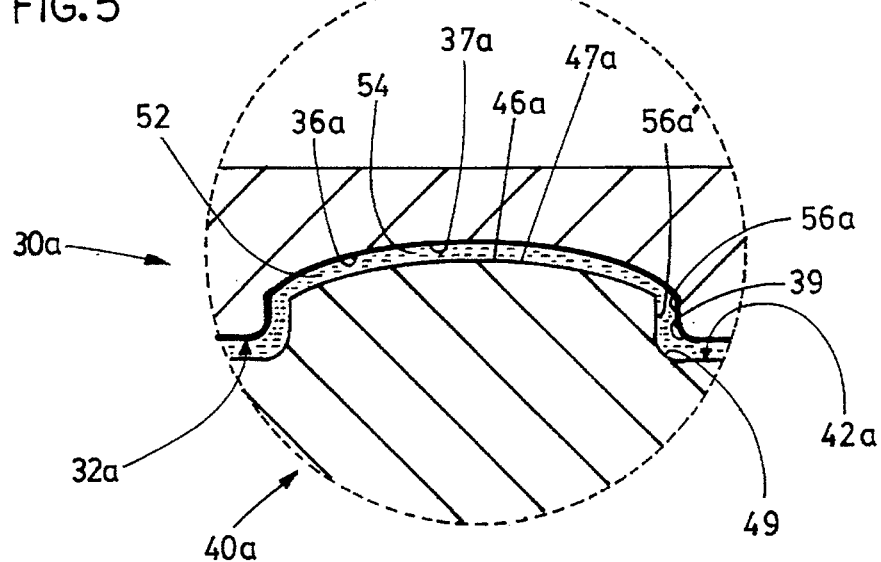
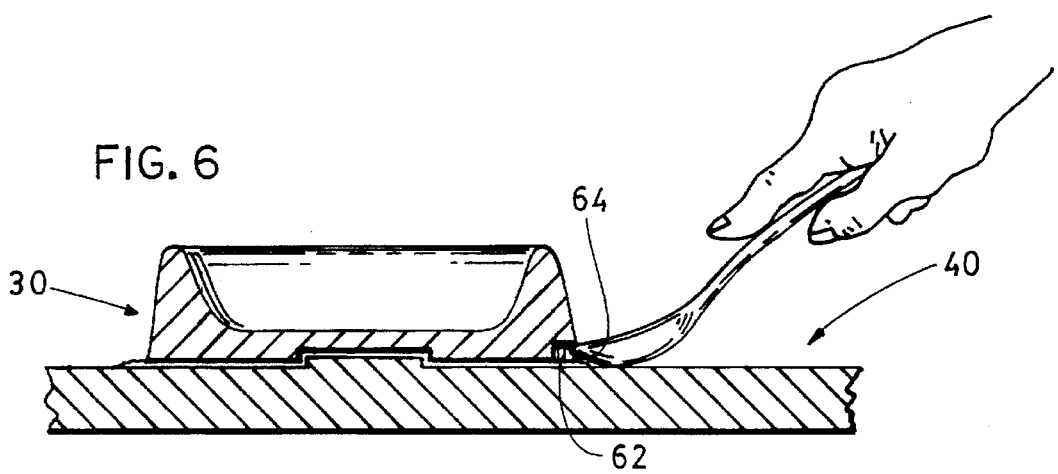

ADHERING STRUCTURES FOR THE PURPOSE OF EMPLOYING THE FORCES OF INTERMOLECULAR ATTRACTION IN LIQUIDS TO CONTROLLABLY AND REMOVABLY ADHERE ONE MANUFACTURED OBJECT TO ANOTHER

BACKGROUND

1. Field of Invention

This invention relates to rotatably, controllably, and releasably adhering one manufactured object to another where it is desired subsequently to unadhere them, such as, for example, adhering work pieces or subassemblies to a base in a work place or on an assembly line, or adhering dishware or other vessels to the top of a tray, box, counter, or table where it may optionally be desired to rotate one object on the other while adhered or attached.

2. Description of Prior Art

There has long been a recognized need for uncomplicated, effective, inexpensive means to temporarily adhere, affix, or attach one manufactured object to another for the purpose of avoiding separation of the two due either to accidental or undesired upset and of being able optionally to rotate such objects upon each other while they remain joined or adhered, if desired, while also being able subsequently to controllably unadhere or detach them and repeat the process when desired.

Examples would be the desirability of attaching a child's bowl to the tray of a high-chair or to a table, of affixing a pet's feeding bowl to a tray or box, of attaching dish-ware or display vessels to the tops of tables, trays, or counters in institutional situations and being optionally able to rotate them, of adhering dish-ware or other vessels to fixed bases in recreational vehicles and boats or ships, or of attaching subassemblies to supporting bases at work stations or in the manufacturing process with an option to rotate them while attached, if desired.

Inventors have created a number of devices to meet various of these needs. Certain of these have relied on vacuum or suction devices. U.S. Pat. No. 5,180,132 to Pearson et al (1993) discloses a suction device attached to the bottom of an article holder which can thus be removably attached to a surface. U.S. Pat. No. 3,765,638 to Harrison (1973) discloses a suction mounting device comprising a housing having a deformable mounting surface that creates suction when deformed. U.S. Pat. No. 2,623,369 to Haydu (1952) discloses an adherent dish connected to a suction cup that adheres temporarily to a table or other supporting plane. All these devices suffer from the disadvantage of most suction-cup devices, which is that they tend to loose their vacuums fairly quickly. In addition, their intricate designs and methods of assembly may make them difficult to wash and clean, and their deformable parts tend to deteriorate.

Mechanical means for removably attaching articles such as dishware to a surface are also disclosed in a number of patents. These include U.S. Pat. No. 2,850,079 to Prushnok et al (1958); U.S. Pat. No. 2,497,194 to White (1950); U.S. Pat. No. 3,512,740 to Podwalny (1970); and U.S. Pat. No. 2,056,437 to Ullmann (1936). A major disadvantage in all these devices is the difficulty they present in washing food from them after use. The collars, slots, bands, and other fastenings of the Prushnok device may tend to become clogged with food during use, as may the hooks, levers, and springs of the White device and the lever, spring, ratchet teeth and other features of the Ullmann device. The O-ring that frictionally engages the socket of the Podwalny patent is intended to be used with refuse and trash cans instead of dishware. When and if used by children, all would present physical risks of having small fingers and nails caught in their intricate mechanisms. All appear difficult to clean, and all involve, to one degree or another, hand assembly, which adds to the cost of their manufacture.

Releasable coupling means are taught in U.S. Pat. No. 3,139,032 to Silverstein (1964), which uses bonding or holding materials that undergo a change in state to cause uncoupling. The device disclosed is intended primarily for military uses.

U.S. Pat. No. 3,275,469 to Streit (1966) discloses a strippable laminate assembly comprising an aqueous adhesive superimposed on a layer of hydrophobic material. However, the principles here taught are more adapted to be used with wallpaper, billboards, posters, and the like. They would be unusable with dishware or in applications where it was intended repeatedly to rotatably adhere and unadhere the same two objects.

Holding devices for food and beverage containers are disclosed in U.S. Pat. No. 4,821,931 to Johnson (1989) and in U.S. Pat. No. 4,928,876 to Marshall (1990). Both patents disclose holding devices having recesses or compartments, and the Marshall patent discloses a container and tray respectively having a complementary recess and projection of substantial size to prevent upset. However, neither of these devices is designed to employ a viscous, continuously flowable, non-curing liquid to inhibit a food container from being lifted vertically from a holding tray, as a child might do, for example.

Devices providing for holders that rotate upon a base are disclosed in a number of U.S. patents. U.S. Pat. No. 271,054 to Fowler (1883), for example, discloses a table top that revolves on rollers running in a grooved base piece to which it is connected by a pivot. U.S. Pat. No. 435,723 to Barnes (1890) teaches a turntable with a hub revolving upon a supporting base also having a hub wherein the hubs are connected by a central pivot integrally connected to one of them and spread on its other end to prevent their separation. U.S. Pat. No. 3,004,745 to Wilson (1961) discloses a shelf that rotates on a bearing plate to which it is connected by a central pivot. And U.S. Pat. No. 5,381,569 to Church (1994) discloses a method for moving a person from a lying position by means of a device having a support member that rotates upon a base member to which it is engaged by a spindle.

None of the foregoing patents teach the use of, or disclose structures or method for using, a viscous, continuously flowable, non-curing liquid as a rotatable adhering medium for rotatably attaching one object to another, such as a holder to a base, while simultaneously lubricatively facilitating rotation of one object upon the other.

In fact, none of the foregoing takes advantage of the adhering and cohering properties of viscous, continuously flowable, non-curing liquids to temporarily and rotatably adhere two manufactured objects together wherein the liquid does not undergo a change in state, this latter phenomenon being the common characteristic of most adhesives. Yet, it has long been understood that the tendency of matter to hold itself together and to cling to other matter, whether in a liquid or solid state, is one of matter's most characteristic properties. Thus, cohesion is said to be the intermolecular attractive force acting between two adjacent portions of the same substance, whereas adhesion is regarded as a similar interaction between the closely contiguous surfaces of adjacent bodies.

In the case of viscous, continuously flowable, non-curing, liquids, these qualities give rise to certain well-known phenomena of which surface tension, wetting, and wicking or capillarity are examples. So, too, is viscosity, which is the resistance that a liquid system offers to flow when it is subjected to shear stress.

An effect of these qualities is a certain stickiness to be felt, for example, when one lifts a flat piece of glass or similar plane from a body of water. More significantly, when this same piece of flat glass is lifted vertically from a thin film of water on a flat glass base or similar plane, it will be realized that a noticeable additional tensile force is required to do so. And when a liquid more viscous than water is spread in a thin film between two glass planes or sheets of glass, even greater tensile force is required to separate them vertically. On the other hand, either rotating them upon each other or separating them by shear force (that is, by a force exerted along a direction parallel to their planes and which would thus result in simply sliding the two sheets of glass laterally apart) remains much easier to do. And lastly, it is the combined adhering, cohering, and shearing properties of liquids that make them effective lubricants. These are phenomena that the present invention seeks to exploit and/or control as a means of controllably and rotatably adhering one manufactured object to another, of being able to lubricatively rotate one object upon another while they remain adhered, and of subsequently being able controllably to unadhere the same. This is to say that the viscous, continuously flowable, non-curing liquids of the present invention are to be distinguished from liquids of the type considered to be glues and adhesives, which dry, cure, or undergo a change of state by which shear flow is lost.

Notable examples of the prior art of utilizing capillary attraction to affix one object to another are in the field of corneal contact lens. U.S. Pat. No. 2,653,515 to Stimson (1953) and U.S. Pat. No. 2,809,556 to Hornstein (1957) disclose concave lens that correspond to specified areas of the cornea resulting in capillary attraction. However, neither of these patents disclose structures suitable for temporarily and rotatably adhering two manufactured objects together.

U.S. Pat. No. 3,666,588 to Wanesky (1972) discloses a method of temporarily holding work pieces (namely small, fragile, integrated circuit chips) on a supporting member using a film of glycerol that is subsequently evaporated by heat, thus releasing the work piece. The device disclosed, however, does not provide means to inhibit separation due to unanticipated or unwanted lateral or shear force applied to the object adhered. It would not, therefore, be suitable for adhering two larger objects where a major objective is to prevent unforeseen or accidental unadhering or upset, or unwanted parallel movement of an object held in relation to a holding surface, as by a child or pet, for example.

OBJECTS AND ADVANTAGES

Accordingly, besides providing simple means whereby manufactured objects such as, for example, dishware, display and other vessels, work pieces, and subassemblies might be controllably, rotatably, and releasably adhered or attached to other manufactured objects such as a supporting base, table, counter, tray, stand, desk, box, or to another work piece, other objects and advantages of the present invention are:

(a) to provide structures for the purpose of employing the forces of intermolecular attraction in liquids to rotatably, controllably, and releasably adhere one manufactured object to another;

(b) to provide means to rotatably, controllably, and releasably attach one manufactured object to another without the use of appended complicated apparatus such as, for example, suction cups, vacuums, magnets, hooks, covers, ties, buckles, springs, snaps, catches, clamps, spindles and the like;

(c) to provide adhering structures that may, if desired, employ as an adhering medium common household and/or kitchen liquids;

(d) to provide structures for rotatably, controllably, and releasably adhering two manufactured objects together that are effective, aesthetically appealing, simple to understand, uncomplicated to operate, safe to use, easy to clean, and inexpensive to manufacture;

(e) to provide structures for controllably and releasably adhering one manufactured object to another manufactured object that permits one object to be rotated in relation to the other while remaining adhered without the use of spindles, central lugs, flanges and the like as means of attachment;

(f) in structures for the purpose of employing the forces of intermolecular attraction in liquids to adhere two manufactured objects together, a sixth object is to provide means that prevent the subsequent unadhering or separation of these objects by the application of shear force alone, and which, therefore, by necessitating the employment of a degree of tensile force to separate or complete such separation, make it more difficult to effect;

(g) in structures for the purpose of employing the adhering and cohering properties of viscous, continuously flowable, non-curing liquids to adhere one manufactured object to another, a seventh object is to provide embodiments of such structures requiring different combinations of tensile and shear force needed to effect separation, thus making the invention adaptable to a variety of needs and requirements;

(h) in structures that may be rotatably, controllably, and releasably adhered to each other by the forces of intermolecular attraction resident in an intermediate, continuously flowable, non-curing liquid medium, an eighth object is to provide simple, uncomplicated means to facilitate the controlled unadhering or separation of such structures;

(i) in structures to rotatably, controllably, and releasably adhere two manufactured objects together, a ninth object is to provide structures that interfere minimally or not at all with alternative uses and purposes unrelated to the adherency of the objects they adhere—the usability of a table as a table without a bowl adhered, for example, or the usability of a bowl as a bowl without a table to put it on.

Still further objects and advantages of the invention will become apparent from a consideration of the ensuing description and drawings.

BRIEF DESCRIPTION OF THE DRAWINGS

FIG. 4 is an enlarged view of a portion of FIG. 3 showing structural details of parallel movement inhibitors comprising rotatable, non-locking, reciprocating abutment means.

FIG. 5 is an enlarged view similar to FIG. 4 showing alternative structure for parallel movement inhibitors shown in FIG. 4.

FIG. 6 is a cross sectional view similar to FIG. 3 showing a method of unadhering the structures of bowl and base.

Figure 1:
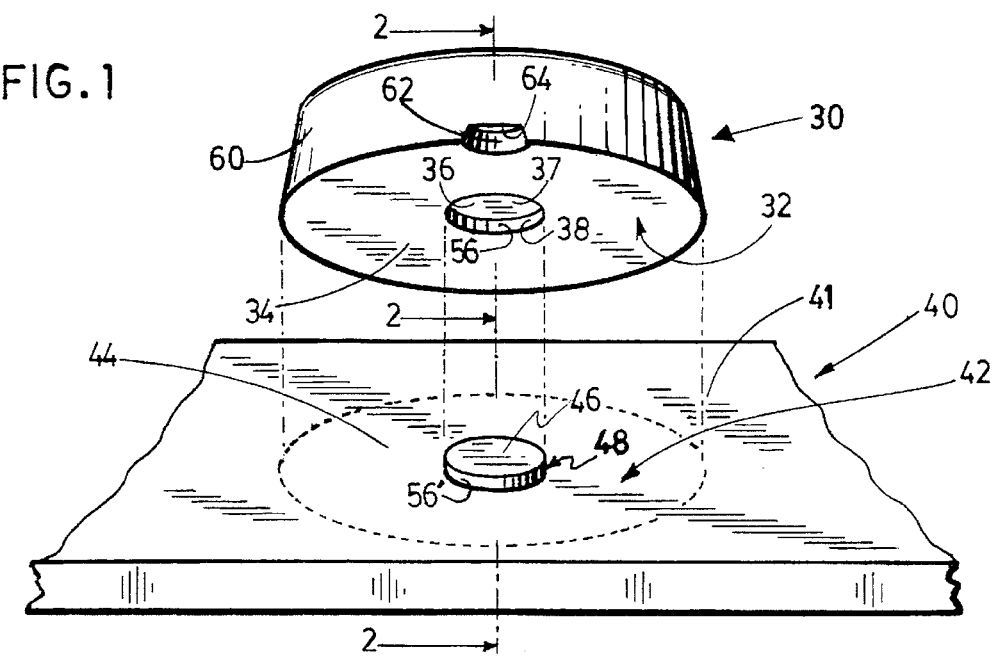
FIG. 1 is an exploded perspective view showing the adhering structures of a bowl and a base.

The following reference numerals are provided in the drawings and descriptive text with different alphabetical suffixes added therein to conform to different embodiments of the invention.

| 30  | bowl                   | 47  | member end              |
|-----|------------------------|-----|-------------------------|
| 32  | bowl adhering structure| 48  | outer band              |
| 34  | bowl adhering portion  | 48' | outer band              |
| 34' | bowl adhering portion  | 49  | flare                   |
| 36  | recess                 | 50  | viscous, continuously flowable, non-curing liquid |
| 37  | ceiling                | 52  | liquid film             |
| 38  | inner band             | 54  | space                   |
| 38' | inner band             | 54' | space                   |
| 39  | flared lip             | 56  | movement inhibitor      |
| 40  | base                   | 56' | movement inhibitor      |
| 41  | base top               | 56" | movement inhibitor      |
| 42  | base adhering structure| 56"'| movement inhibitor      |
| 44  | base adhering portion  | 58  | inside wall             |
| 44' | base adhering portion  | 60  | outside wall            |
| 46  | protruding member      | 62  | niche                   |
|     |                        | 64  | grappling point         |

SUMMARY

The structures of the present invention are for employing the forces of intermolecular attraction in viscous, continuously flowable, non-curing liquids to rotatably, controllably, and releasably adhere two manufactured objects together. These structures comprise (1) reciprocal complementary surface adhering portions integral to each of two manufactured objects to be adhered whereby the cohering and adhering properties of non-curing liquids may be mobilized to rotatably adhere adjacent portions when the same are fitted reciprocally together with a film of viscous, continuously flowable, non-curing liquid compressed between them, and (2) rotatable, non-locking, parallel movement inhibiting abutment means for inhibiting parallel movement of either adhering portion away from the other while rotatably adhered, thereby estopping them from being simply slid apart or separated by shear force alone, while, at the same time, permitting them to be rotated upon each other while remaining adhered and to be separated by tensile force. The structures that result may utilize the adhering and cohering properties of viscous, continuously flowable, non-curing liquids to rotatably adhere two manufactured objects together while effecting control over the process of their unadhering.

DESCRIPTION OF THE PREFERRED EMBODIMENTS

Following are descriptions of the preferred embodiments of the invention.

In the illustrations and their descriptions that follow, these objects are illustrated respectively as a dish or bowl 30 and a supporting base 40 (never fully shown). However, it is intended that, in all drawings hereinafter described, bowl 30 be representative of a variety of objects, including, but not limited to, cups, dishes, glasses, pots, vases, and other vessels and objects, including work pieces and subassemblies in the manufacturing process. Similarly, it is intended that supporting base 40 also be representative of a variety of objects, including, but not limited to, tables, trays, boxes, counters, desks, a work station, another work piece, subassembly, or any manufactured object to which it is desired to controllably and removably adhere the first object.

Both bowl 30 and base 40 and the objects which they represent, together with their associated adhering structures, may generally be manufactured of the same materials of which they are presently manufactured, as well as by the same processes as those skilled in the art of making these products will recognize. Materials include, but are not limited to, wood, metal, plastics, glass, ceramics, resins and resin mixtures, and virtually any material or combination of materials that can be stamped, molded, pressed, carved, or otherwise shaped or assembled into the products represented by bowl 30 and base 40.

A preferred embodiment of the adhering structures of the present invention is illustrated in FIGS. 1 (exploded perspective), 2, and 3 (sectional views). Accordingly, FIG. 1 is an exploded perspective view, which, in its upper portion, shows bowl 30 as having on its bottom or underside, and integral thereto, a bowl adhering structure 32. Structure 32 comprises a bowl bottom surface adhering portion 34 and an adhering portion recess 36, which provides structure for inhibiting parallel movement of bowl 30 away from base 40, as hereinafter described. Recess 36 is circular, has a ceiling 37, and is defined around its circumference by an annular upright inner band 38, one edge of which borders ceiling 37 and the other edge of which borders the lip of the recess. Recess 36 is in the approximate center of structure 32 and of portion 34, which encompass it.

In its lower portion, FIG. 1 shows supporting base 40 as having an upper surface or top 41, which carries a base adhering structure 42 that is essentially complementary to structure 32. Structure 42 comprises an essentially flat, upper surface, base adhering portion 44 and a protruding button or disk member 46, which provides structure reciprocal to the structure of recess 36 for inhibiting parallel movement of bowl 30 away from base 40, as hereinafter described. Member 46 is in the center of and encompassed by portion 44; it is circular; and it provides structure around the rim of its circumference for an annular upright outer band 48. Member 46 is essentially complementary to recess 36, except that member 46 has a marginally smaller circumference than recess 36 whereby the former may be seated in the latter without friction, as illustrated in FIGS. 3 and 4.

Figure 2:
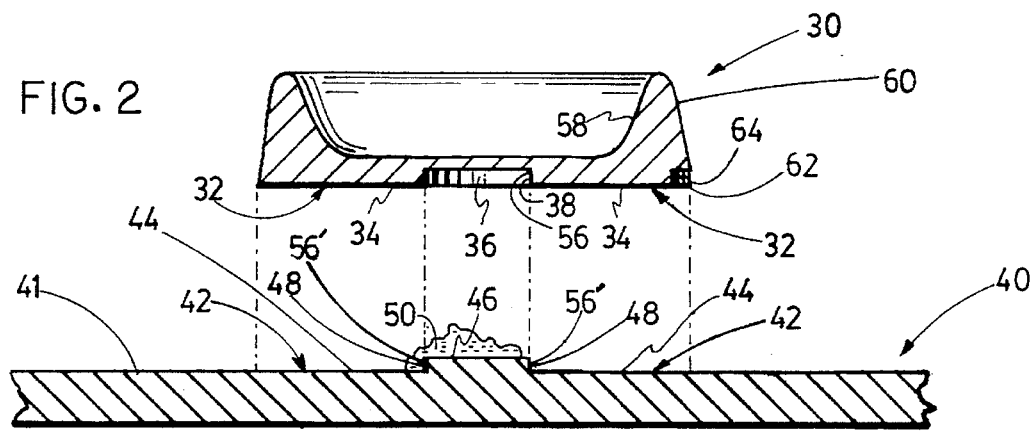
FIG. 2 is an exploded cross sectional view taken substantially upon the plane indicated by section line 2—2 of FIG. 1 with a quantity of viscous liquid added.

FIG. 2 is an exploded cross sectional view taken along lines 2—2 of FIG. 1, which shows bowl 30 juxtaposed over base 40 prior to being adhered. FIG. 2 shows a quantity of viscous, continuously flowable, non-curing liquid 50 as having been placed in the approximate center of portion 44, which is also the approximate location of member 46 in this embodiment of the invention.

Figure 3:
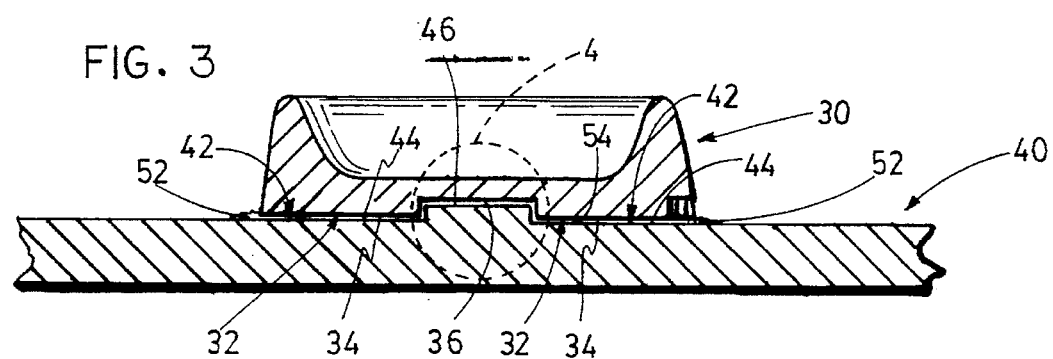
FIG. 3 is an unexploded cross sectional view similar to the plane of FIG. 2 showing adhering structures in an adhering mode.

FIG. 3 is an unexploded cross sectional view showing the same plane as in FIG. 2. FIG. 3 shows bowl 30 and base 40 with their respective adhering structures 32 and 42 in a rotatable adhering mode. Complementary adhering portions 34 and 44 are accordingly shown as approximately fitting together, and member 46 is shown as seated in recess 36, the two being complementary.

FIG. 4 is an enlarged partial cross sectional view taken from FIG. 3 showing in greater detail the seating of member 46 in recess 36 with vertical bands 38 and 48 now in opposing positions. Liquid 50 of FIG. 2 is shown in FIGS. 3 and 4 as having been spread by means to be hereinafter described into a flowable adhering medium or viscous liquid film 52, which occupies a thin intervening space 54 that extends continuously between matching adhering structures 32 and 42, including space 54' around and between respective bands 48 and 38 (which is best seen in FIG. 4). The circumferences of respective bands 48 and 38, as seen in FIGS. 3 and 4, are sufficiently different in their magnitudes to provide for the unbroken continuity of space 54 as space 54' between them. It will be apparent that the width of space 54' (FIG. 4) is determined and built into bowl 30 and base 40 at the time of their manufacture, whereas the width of space 54 (excluding space 54') generally will be determined by the degree of compressive force applied during the process of adhering. The width of space 54' is important because, as a general rule, the more viscous the liquid intended to be used as a flowable adhering medium, the wider space 54' must be.

By providing support structure for opposing bands 38 and 48 respectively, recess 36 and member 46 provide adhering structures 32 and 42 with rotatable, non-locking, reciprocally abutting parallel movement inhibitors 56 and 56'. These are seen in FIGS. 1-3, but are best illustrated in FIG. 4. Reciprocally abutting parallel movement inhibitors 56 and 56', which are identical with bands 38 and 48, inhibit parallel movement of structure 32 away from structure 42 while in their adhering mode, and thus of bowl 30 away from base 40, while, at the same time, allowing bowl 30 to be rotated on base 40 while remaining adhered, as well as allowing bowl 30 to be lifted vertically from base 40 by tensile force sufficient to overcome the forces of intermolecular attraction in liquid film 52. Specifically, reciprocating inhibitors 56 and 56' inhibit separation by shear alone of film 52 and thus of structure 32 from structure 42 when force is directed laterally, either directly or by sudden displacement, against either bowl 30 or base 40 when in their rotatable adhering mode (FIG. 3).

Since the degree of tensile force or vertical pull required to separate bowl 30 from base 40 after they have been adhered will, in part, depend on the surface area magnitudes of portions 34 and 44 and of recess 36 and member 46 (FIG. 3), the greater the surface areas of these features, the greater generally will be the energy required to unadhere them. Designs of bowl 30 and the objects that it represents may differ for different uses and aesthetic tastes, for which reason it may be desired, in certain designs, that structure 32 not cover the entire under side of bowl 30. Even so, other things being equal, the matching surface areas of portions 34 and 44, together with recess 36 and member 46, must be of sufficient magnitude to mobilize in an intermediate liquid the resistance to tensile force that is desired for the structures as a whole.

Within these parameters, the relative sizes of matching recess 36 and member 46, as best seen in FIG. 4, may vary greatly. Since recess 36 and member 46 primarily provide structure for opposing bands 38 and 48, and thus for inhibitors 56 and 56', they need minimally have only sufficient breadth or width and depth or height to achieve this purpose. On the other hand, aesthetic considerations may dictate a much larger size in relation to portions 34 and 44, which may be done without altering the essential function and effectiveness of recess 36 and member 46 so long as they remain essentially complementary in size, shape, and surface contour. FIG. 2 shows bowl 30 as being optionally provided with an anticlinal wall composed of inside wall 58 and outside wall 60, their inward cant in relation to each other being to render the gripping of bowl 30 more difficult.

FIG. 5 is an enlarged cross sectional view showing an alternative configuration of some of the elements seen in FIG. 4. Accordingly, alternative recess 36a is shown as having a concave ceiling 37a while member 46a is shown as having a matching convex roof 47a. While inhibitors 56a and 56a' still oppose each other, they are seen as having been slightly modified in that recess 36a is shown as having a flared annular lip 39, which is matched by an outward flare 49 around the circular base of member 46a. The flaring of the lip of recess 36a and the convex roof of member 46a may facilitate the process of fitting base 40a to bowl 30a as they are brought into an adhering mode. Continuous space 54 and 54' between reciprocally fitting structures 32a and 42a is occupied by liquid film 52, as in FIG. 4, which acts as a flowable adhering medium so that the essentials of rotatably adhering one structure to the other are unchanged. Thus, the point is made that the interfacing surfaces of structures 32 and 42 may alternatively have a variety of contours, sizes, and shapes without altering their effectiveness so long as they provide adequate complementary adhering surface area and reciprocating structure to inhibit parallel movement of one structure away from the other.

Concerning the deliberate unadhering of bowl 30 from base 40 when it is desired to do so, FIGS. 1-3 show outside wall 60 of bowl 30 to be optionally provided with a grappling indentation or niche 62, the ceiling of which constitutes a grappling point 64. The purpose of niche 62 and of grappling point 64 is to provide optional grappling means by which bowl 30 may be unadhered or pried or leveraged loose from base 40 by tensile force acting in a direction perpendicular to the imaginary plane of bowl 30. This process is illustrated in FIG. 6.

The manner of rotatably adhering the structures of the invention is extremely simple. In the embodiment shown in FIGS. 1-6, bowl 30 is rotatably adhered to base 40 by placing a quantity of viscous, continuously flowable, non-curing liquid 50 over or around member 46, which is in the approximate center of structure 42 and of portion 44 (FIG. 2), and then by compressively rotating bowl 30, and thus also structure 32, which includes portion 34 with recess 36 in its center, onto reciprocally receiving complementary structure 42. As this is done, the shearing forces of rotation cause viscous liquid 50 to spread outwardly, thus shearing into liquid film 52 interposed in space 54 (including space 54', seen best in FIG. 4) across the interface intermediate complementary and now close-fitting adhering structures 32 and 42 of bowl 30 and base 40, as illustrated in FIG. 3. Liquid film 52 thus spread across the interface of complementary portions 34 and 44 becomes a flowable adhering medium that serves to rotatably adhere portion 34 to portion 44 by virtue of the forces of intermolecular attraction in the film while simultaneously serving as a lubricant by virtue of its shearing properties to facilitate rotation of the portions upon each other.

It should be noted that the resulting rotatability of bowl 30 on base 40 while both base and bowl remain adhered may be a highly desired feature in certain applications of this and certain other embodiments of the invention. For example, by employing the structures of the present invention, a large bowl or tray could be rotatably adhered to the top of a table, which would make its entire contents more accessible to all who were near it.

In their rotatable adhering mode, as illustrated in FIG. 3, structures 32 and 42 can only be unadhered through the application of tensile force. This is because vertical, annular parallel bands 38 and 48, which mutually oppose each other, thus provide structures 32 and 42 with rotatable, non-locking, reciprocating abutments that function as parallel movement inhibitors 56 and 56'. This is best seen in FIGS. 4 and 5. Thus, inhibitors 56 and 56' not only inhibit but entirely estop parallel movement away from each other of structures 32 and 42, thereby preventing their separation by application of shear force alone, that is, by simply sliding them apart.

The advantage of structures that limit the unadhering process to the application of tensile rather than shear force is that tensile force effects separation only at the culmination of a buildup or concentration of energy sufficient to overcome the bond of intermolecular attraction. Separation by accidental displacement of either bowl 30 or base 40, or by direct force applied to either one or the other, as by a child or a pet, for example, is thus made more difficult.

To aid in separating bowl 30 from base 40 when it is desired to do so, optional niche 62 provides grappling structure whereby leverage may be applied to pry one from the other by employing such simple household instruments as, for example, a spoon. FIG. 6 is a partial cross sectional representation similar to FIG. 3 showing how bowl 30 may be pried from base 40 using a spoon as a lever turning on the axis of its bowl. In FIG. 6, the tip of a spoon is shown as being inserted into niche 62 to lift against point 64, the spoon's handle serving as the arm of a lever extending from the spoon's other tip. Access to niche 62 may be made difficult for a child merely by rotating bowl 30 during the adhering process so that niche 62 is out of sight.

In applications where the rotatable adhering structures of the present invention are employed with bowls or other dishware having flared sides, walls, or other extremities, the need for niche 62 with grappling point 64 may be obviated since such flared sides, walls, or other extremities would themselves provide adequate grappling and lifting means.

In the rotatable adhering mode shown in FIG. 3, within the range of normal room temperatures the degree of adherence between structures 32 and 42 depends in part upon the area magnitudes of the adhering portions, in part upon the viscosity of the liquid employed, and in part upon the amount of compressive rotational force applied to adhere them. This force, in turn, determines the thinness of film 52, which is thereby spread between them. As those knowledgeable in the relevant field of physics will recognize, the thinner film 52 can be spread, the greater will be the tensile force required to overcome intermolecular attractions within the film and between it and its adjacent structures, thus effecting their separation.

In practical experiments with various embodiments of rotatable adhering structures, including the one illustrated in FIGS. 1–3, it has been found that numerous ordinary household liquids will provide adequate adherence to effectively deter a child from lifting bowl 30 from its supporting base 40 by tensile force. These liquids include, but are not limited to, petroleum jelly, liquid dish-washing soap, syrup, honey, catsup, mustard, mayonnaise, salad and cooking oils, fruit jellies and gelatin, aspic, smooth peanut butter, yogurt, smooth sauces, pastes, and smooth pates.

As an example, the following table shows the number of seconds that the adhering structures of the present invention resisted a tensile force of 9.08 kg (20 lbs) when each of the liquids specified below was tested as a flowable adhering medium in an environment having an ambient temperature of 72° F. In each case, a bowl structure was employed having a bottom radius of 7.93 cm (3.125 inches), thus providing a base adhering portion with a magnitude of 197.55 cm$^2$ (30.67$^2$ inches).

| Liquid | Seconds | Liquid | Seconds |
| --- | --- | --- | --- |
| maple syrup | 12 seconds | liquid soap | 16 seconds |
| catsup | 12 seconds | Jelly | 26 seconds |
| chocolate syrup | 14 seconds | Honey | 33 seconds |
|  |  | Peanut butter | 55 seconds |

Using smooth peanut butter, the structure, as specified, resisted a tensile force of 13.62 kg (30 lbs) for 11 seconds, equal to approximately 0.454 kg (1 lb) per 6.44 cm$^2$ (1 inch$^2$) of bowl adhering portion surface. In general, tests verified what would have been expected on a theoretical basis: the greater the viscosity of the liquid employed, the greater the adherence that the structures effected.

The probable reason that a viscous, continuously flowable, non-curing liquid can be employed to rotatably adhere two objects together using the adhering structures described herein derives from the adhering and cohering properties of liquids themselves. These properties are generally regarded as expressions of the intermolecular forces that hold matter together, cohesion being the force thought to act between adjacent portions of a substance, and adhesion being the force thought to act between two dissimilar substances in contact. In general, these forces act over a short range and vary in magnitude depending on the substances concerned. Viscosity is regarded as one of the resulting phenomena of this intermolecular attraction.

A measure of the strength of the forces of adhesion and cohesion may be found in the cohesion hypothesis in botany, which is a generally accepted explanation for the rise of sap in plants. Calculation and experiment indicate that the forces of adhesion and cohesion in a tree, for example, are sufficient to confer on thin columns of water a tensile strength of at least 40 atmospheres, or 199.58 kg (440 lbs) per 6.44 cm$^2$ (1 inch$^2$). This strength, of course, cannot be separated from the structure within which it operates.

Referring now to the adhering structures of the present invention, in the rotatable adhering mode illustrated in FIG. 3, adherence will have been achieved for reasons similar, it is thought, to those that confer strength on a thin column of sap in a tree. This will be recognized by anyone who has ever pressed two wet pieces of sheet glass together and then found them sticking. The phenomenon comes about, it may be theorized, because any effort to separate them must overcome the adhering and cohering properties of the thin liquid film spread between them.

Specifically, as one sheet of glass is lifted by tensile force from the other, it may be inferred that the intervening liquid film not only adheres to the adjacent surfaces of both adhering sheets, but, because of the liquid's internal cohesion and its resulting surface tension, tends also to resist the pulling apart of its own internal molecules. Moreover, the closer the two sheets of glass and the thinner the liquid film between them, the more the energy that appears to be required to break this cohesion and the surface tension of the intervening liquid film by tensile force and thus effect separation of the sheets of glass.

By the same token, as anyone who has ever placed two wet pieces of sheet glass together and found them sticking will have discovered, the easiest way to unstick them is to slide them apart, that is to separate them by shear rather than by tensile force. Thus, another property of a viscous, continuously flowable, non-curing liquid that is relevant to the present invention is its shearing property, whereby it may also function as a lubricant to facilitate rotation of one adjacent surface upon another at the same time that the liquid is adhering them.

All the foregoing are phenomena that the rotatable adhering structures of the present invention are intended to employ. On the one hand they provide maximum complementary or matching surface areas on each of two manufactured objects rotatably adhered, which matching surface areas, when closely pressed together with a thin film of viscous, continuously flowable, non-curing liquid spread between them, mobilize the forces of intermolecular attraction just described. On the other hand, by incorporating rotatable, reciprocally abutting parallel movement inhibitors, the structures of this invention prevent their own separation from an adhered mode by application of shear force alone, while, at the same time, permitting themselves to be rotated upon each other.

Figure 7:
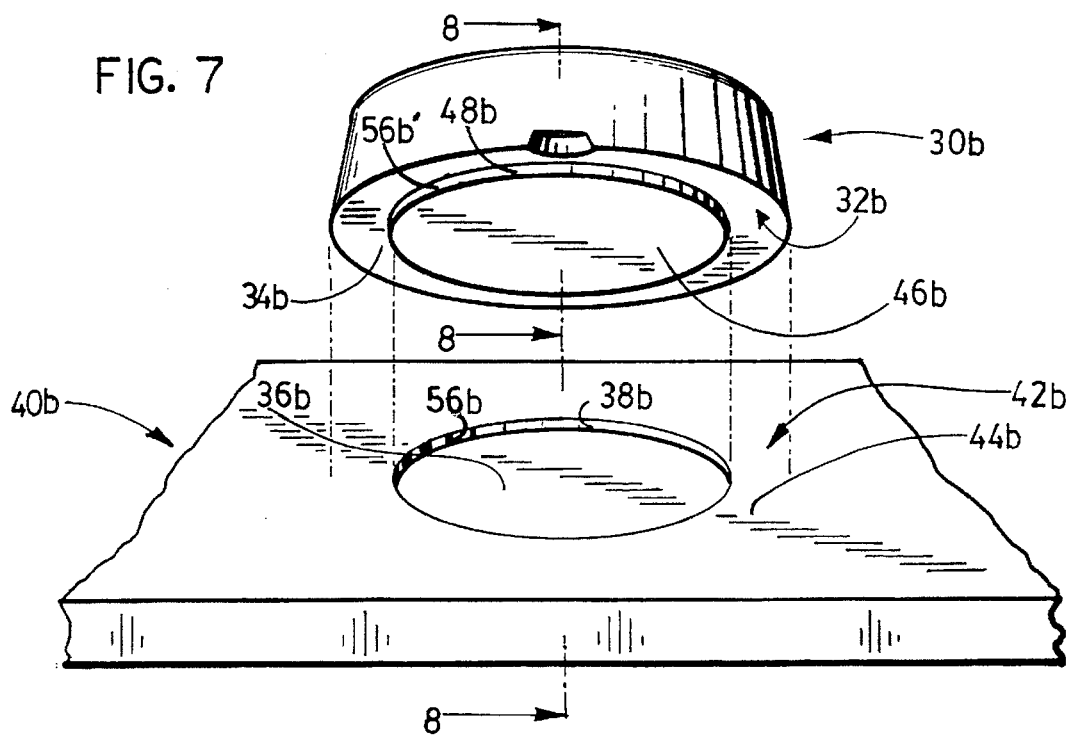
FIG. 7 is an exploded perspective view showing embodiment B of the adhering structures.
Figure 8:
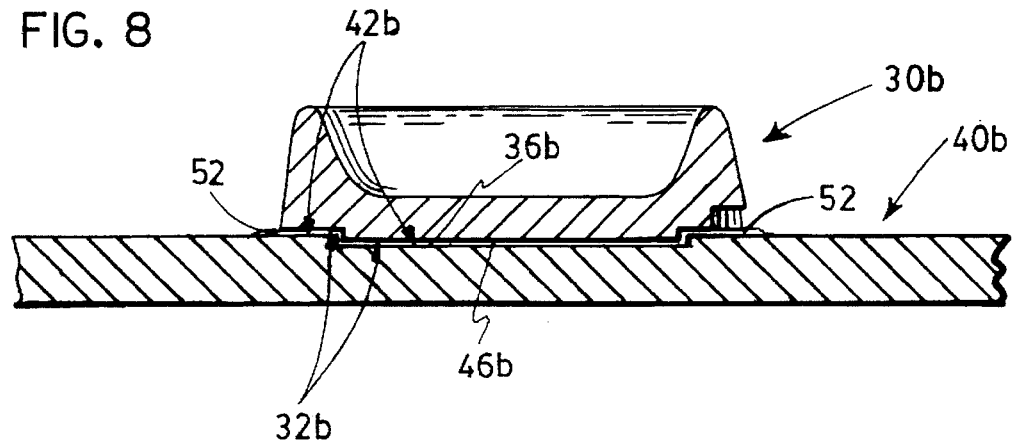
FIG. 8 is an unexploded cross sectional view of embodiment B taken substantially along lines 8—8 of FIG. 7.

FIGS. 7 and 8 show an alternative embodiment B of the invention in which the objects to be adhered are again representationally illustrated as bowl 30b and base 40b. FIG. 7 is an exploded perspective view similar to FIG. 1 showing bowl 30b as again having a bowl adhering structure 32b. In this embodiment, however, structure 32b comprises a bottom surface adhering portion 34b and a protruding disk member 46b instead of recess 36 as seen in FIGS. 1–3. Conversely, base adhering structure 42b in FIG. 7 comprises an upper surface adhering portion 44b and an adhering portion recess 36b instead of member 46, as seen in FIGS. 1–3. Thus, in FIG. 7 the objects representationally illustrated as bowl 30b and base 40b are virtually the same as seen in FIGS. 1–3, except that the relative positions of recess 36 and member 46 and the elements associated with them such as bands 38 and 48, and inhibitors 56 and 56' in FIGS. 1–3, are inverted. In FIG. 7 these elements appear as bands 38b and 48b and inhibitors 56b and 56b'. Additionally, the relative breadths or widths of member 46b and recess 36b are illustrated as being proportionally greater. Even so, their functions remain the same, which are to permit rotation of one structure upon the other while inhibiting parallel movement that would lead to their separation by providing inhibiting means previously described, and to contribute maximum complementary rotatable adhering surface. Their enlargement over their counterparts in the embodiment shown in FIGS. 1–3 illustrates that their widths and breadths as well as their height and depth may vary greatly without essentially altering either their function or their effectiveness.

FIG. 8, which is similar to FIG. 3, is a cross sectional view taken substantially along lines 8—8 of FIG. 7, but shows bowl 30b and base 40b in a rotatable adhering rather than exploded position. Member 46b of bowl 30b is accordingly shown as seated in recess 36b of base 40b with liquid film 52 spread thinly between complementary and close-fitting structures 32b and 42b. Again, the elements of structures 32b and 42b provide interfacing surfaces to mobilize the forces of intermolecular attraction in film 52, thus causing them to stick together; and again, elements of the structures also provide rotatable, non-locking, reciprocating abutment means to inhibit parallel movement of either bowl 30b or base 40b away from the other.

Figure 9:
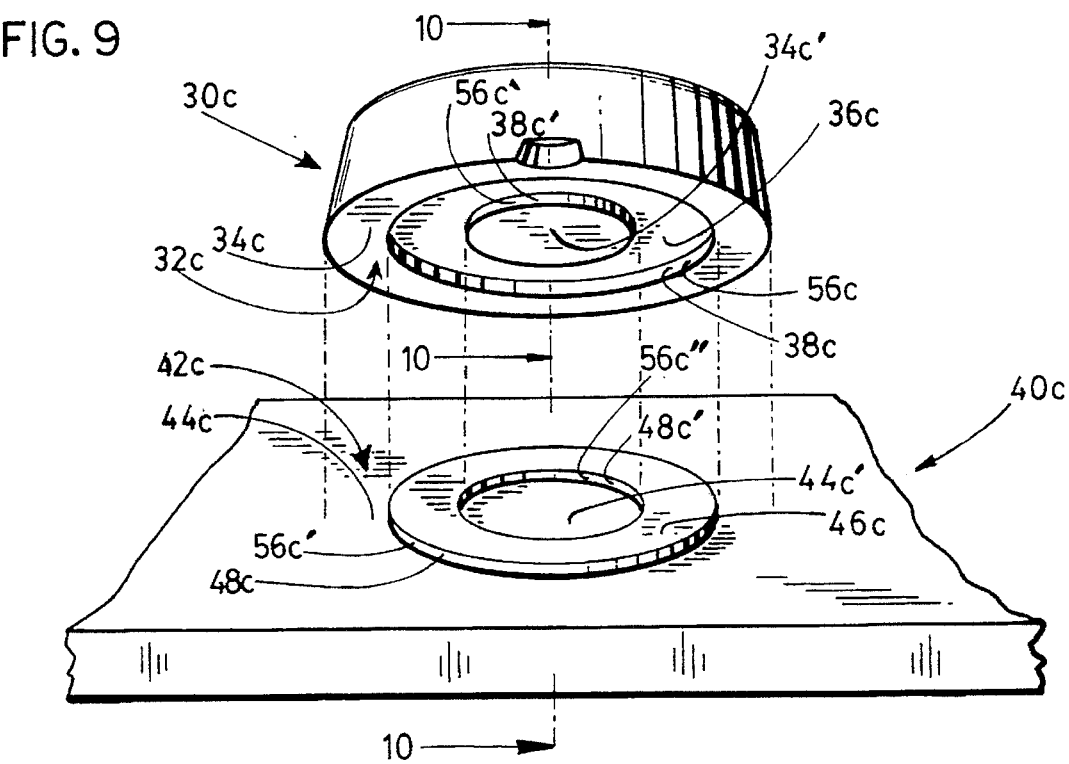
FIG. 9 is an exploded perspective view of embodiment C of the adhering structures.

FIG. 9 is an exploded perspective view of embodiment C. Bowl 30c on its bottom, and base 40c on its top, are again shown as having complementary adhering structures 32c and 42c respectively. FIG. 9 shows bowl adhering structure 32c as comprising adhering portion 34c, a ring-shaped channel or continuous recess 36c and a second adhering portion 34c', which is in the center of and encircled by ring-shaped recess 36c. Conversely, structure 42c comprises adhering portion 44c, a protruding member 46c, which is in the shape of a protruding ring or flat donut, and a second or central adhering portion 44c', which is the central recess encircled by member 46c. Ring-shaped member 46c is essentially complementary to ring-shaped recess 36c. Likewise, portions 34c and 34c' are essentially complementary to portions 44c and 44c' respectively. Thus, as in earlier embodiments, bowl structure 32c, including its constituent elements, is approximately complementary to base structure 42c and its constituent elements.

As in earlier embodiments, member 46c and recess 36c carry opposing walls or bands 48c and 38c respectively around their outer circumferences. Since both are ring-shaped, they also carry additional opposing bands 48c' and 38c' around their respective inner circles. As in embodiments already discussed, opposing bands 48c and 38c constitute rotatable, non-locking, reciprocally abutting parallel movement inhibitors 56c' and 56c respectively. Opposing bands 48c' and 38c' respectively constitute additional inhibitors 56c'' and 56c'.

Figure 10:
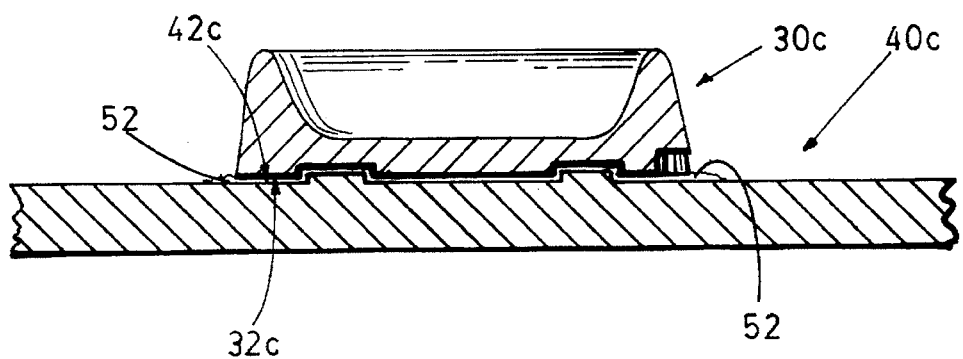
FIG. 10 is an unexploded cross sectional view of embodiment C taken substantially along lines 10—10 of FIG. 9.

FIG. 10 is a cross sectional view taken substantially along lines 10—10 of FIG. 9 except that bowl 30c and base 40c are shown not in an exploded position but as being pressed together in a rotatable adhering mode. Structures 32c and 42c and all their constituent elements are accordingly shown as fitting closely together with a thin liquid film 52 spread between them. Again, it will be seen that the interface of structures 32c and 42c is such that parallel movement of one away from the other is not only inhibited but entirely estopped.

Clearly, many modifications could be made to embodiment C in FIGS. 9 and 10 without departing from the essence of the invention. For example, instead of just one ring-shaped recess there could be a multiplicity of concentric ring-shaped recesses matched by an equal number of concentric ring-shaped protrusions, all complementary in size and shape. Additionally, the relative positions of these recesses and protrusions could be inverted. None of these modifications or alternative configurations would depart from the essential elements of the present invention, nor would they substantially alter its operation and effectiveness.

Figure 11:
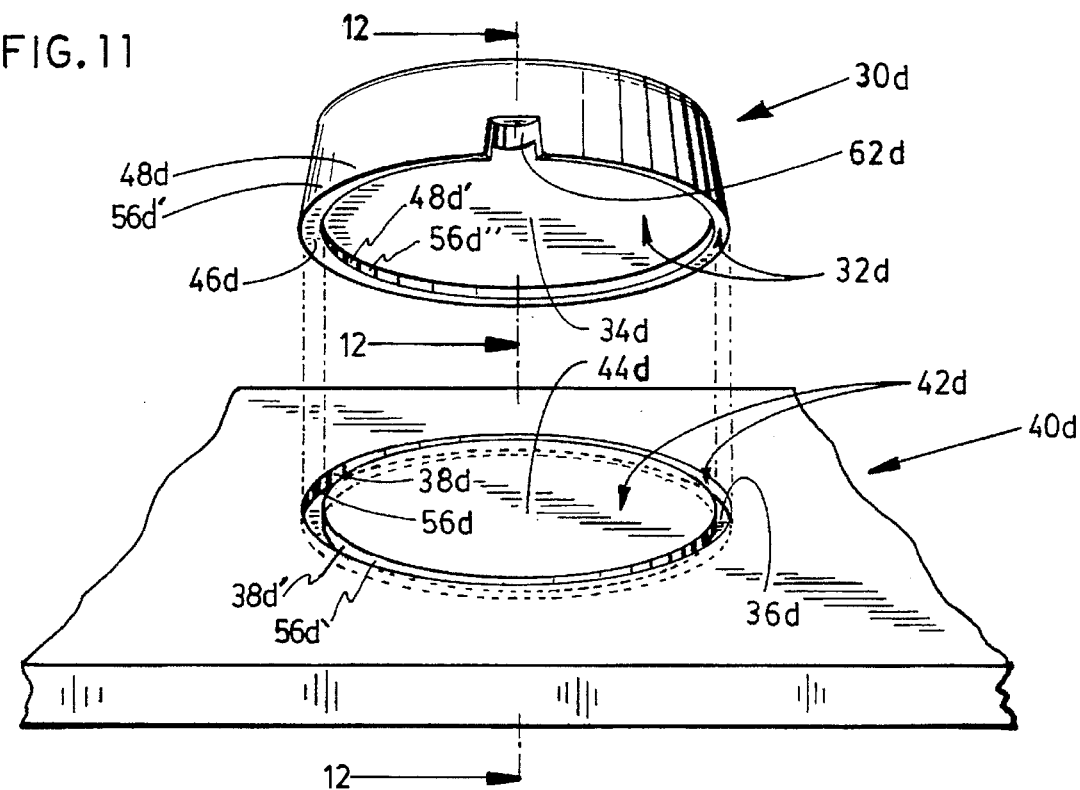
FIG. 11 is an exploded perspective view of embodiment D of the adhering structures.

FIG. 11 is an exploded perspective view of embodiment D of the present invention wherein the adhering structure 32d of bowl 30d comprises (1) an adhering portion 34d made up of the entire bottom or underside of bowl 30d, (2) an outer annular bottom-protruding tongue member 46d that extends downward from and around the bottom periphery of bowl 30d, and (3) parallel movement inhibitors 56d' and 56d", which are formed respectively by the inner and outer annular bands 48d and 48d' that make up the two sides of tongue member 46d. Conversely, base 40d carries adhering structure 42d, which comprises (1) an upper surface adhering portion 44d, (2) an annular grooved recess 36d that encompasses it and is essentially complementary to protruding tongue member 46d, and (3) parallel movement inhibitors 56d and 56d', which are formed respectively by the two sides 38d and 38d' of annular grooved recess 36d.

Figure 12:
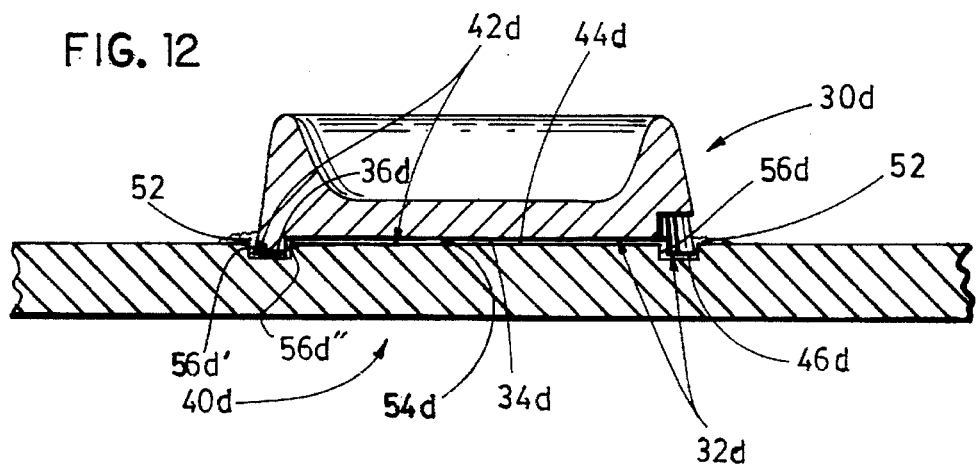
FIG. 12 is an unexploded cross sectional view of embodiment D taken substantially along lines 12—12 of FIG. 11.

FIG. 12 is a cross sectional view taken substantially along lines 12—12 of FIG. 11, except that, instead of being juxtaposed in an exploded position, bowl 30d and base 40d are shown as fitting reciprocally together in an adhering mode with a thin liquid film 52 spread over their interface. As always, structures 32d and 42d are essentially complementary, as are all their constituent elements, so that parallel movement of bowl 30d away from base 40d is inhibited. Although portions 34d and 44d are illustrated in FIGS. 11 and 12 as being flat, portion 34d could alternatively be convex and portion 44d correspondingly concave, or the reverse, without altering their essential purpose or effectiveness. Tongue member 46d is illustrated as having an approximately square-U shape, as is grooved recess 36d, but they could alternatively be V-shaped, or have a curved U-shape.

FIG. 11 shows tongue member 46d as extending continuously around the bottom peripheral edge of bowl 30d, except where broken by niche 62d. If desired, however, tongue member 46d may alternatively project into grooved recess 36d only intermittently so long as the frequency, length, and placement of its protruding portions are sufficient to inhibit parallel movement of structure 32d away from structure 42d when in their rotatable adhering mode. The breadth of grooved recess 36d is marginally wider than the width of tongue member 46d so that space 54d forms between them whenever a viscous liquid is spread by compressive rotational force as a continuously flowable adhering medium or flowable liquid film 52 between structures 32d and 42d, as seen in FIG. 12.

Figure 13:
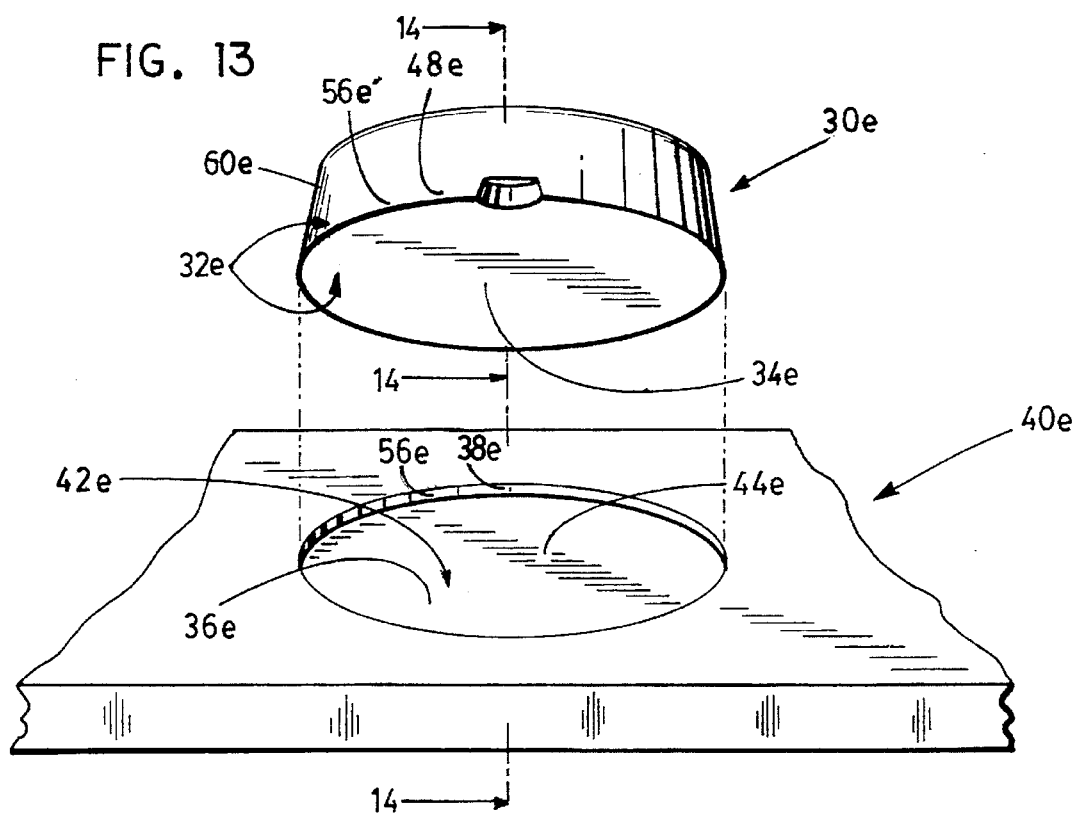
FIG. 13 is an exploded perspective view of embodiment E of the adhering structures.

FIG. 13 is an exploded perceptive view of bowl 30e and base 40e illustrating embodiment E of the adhering structures of the present invention. Here, bowl 30e is provided with an adhering structure 32e that comprises (1) an adhering portion 34e covering the entire circular, essentially flat bottom of bowl 30e, and (2) a parallel movement inhibitor 56e', which is the approximately upright outer band 48e that encircles bowl 30e around the lower edge of its outside wall 60e. Conversely, base 40e carries on its top an adhering structure 42e that comprises (1) an essentially circular adhering portion recess 36e, (2) an adhering portion 44e made up of the floor of recess 36e, and (3) a parallel movement inhibitor 56e, which consists of the essentially upright annular inner band 38e that forms the wall of recess 36e.

Figure 14:
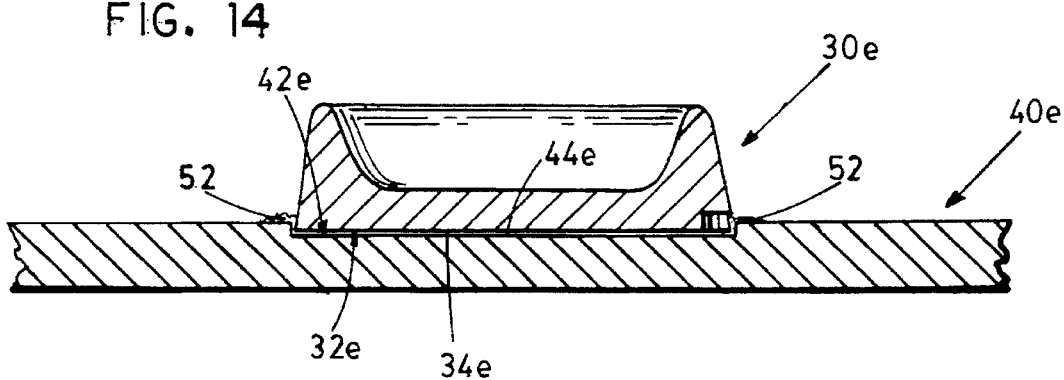
FIG. 14 is an unexploded cross sectional view of embodiment E taken substantially along lines 14—14 of FIG. 13.

Structures 32e and 42e are again essentially complementary in size, shape, and contour, the circumference of inner band 38e being marginally greater that the circumference of outer band 48e so that structures 32e and 42e may be reciprocally fitted together. Although portions 34e and 44e are shown in FIGS. 13 and 14 as being essentially flat, portion 34e could alternatively be concave and matching portion 44e correspondingly convex (or their inverse) without altering their essential purpose or effectiveness. As in earlier embodiments, bands 38e and 48e oppose each other in the rotatable adhering mode, thus serving respectively as rotatable, non-locking, reciprocally abutting, parallel movement inhibitors 56e and 56e'.

FIG. 14 is a cross sectional view taken essentially along the lines 14—14 of FIG. 13, but shows bowl 30e and base 40e fitting closely together in their rotatable adhering mode rather than juxtaposed in an exploded position. Accordingly, structures 32e and 42e and their constituent elements are shown as reciprocally fitting together with liquid film 52 interposed on their interface.

Figure 15:
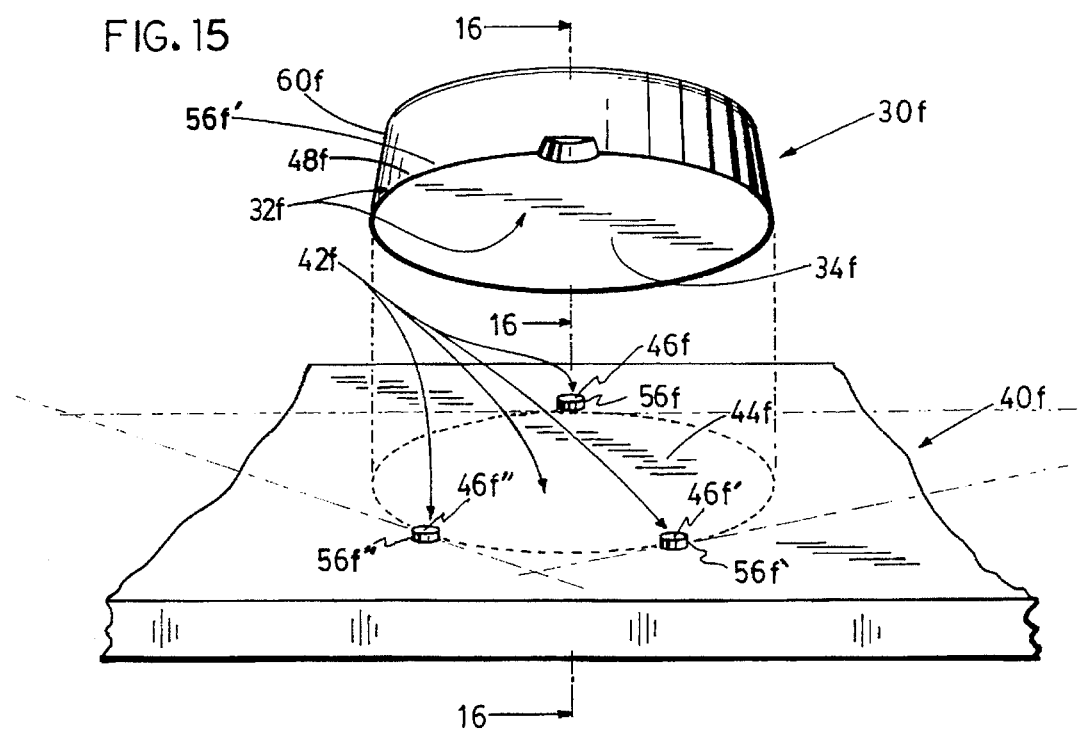
FIG. 15 is an exploded perspective view of embodiment F of the adhering structures.

FIG. 15 is an exploded perspective view of embodiment F of the present invention. Bowl 30f is illustrated as having a bowl adhering structure 32f comprising (1) an adhering portion 34f consisting of the entire bottom or underside of Bowl 30f, and (2) an abutting parallel movement inhibitor 56f', which is the peripheral, essentially upright outer band 48f that encircles the base of bowl 30f and forms the foundation of its outside wall 60f. Base 40f is illustrated as having a base adhering structure 42f that comprises (1) an adhering portion 44f (which is shown in dotted lines, consists of a portion of the top of base 40f, and has a size, shape, and surface contour essentially complementary to portion 34f), and (2) three abutment buttons or protruding members 46f, 46f', and 46f" that protrude from the top of base 40f and which, around their respective upright walls, provide structure 42f with abutting parallel movement inhibitors 56f, 56f', and 56f".

Members 46f, 46f', and 46f" are so positioned that their outer rims or walls making up abutting inhibitors 56f, 56f', and 56f" border and touch the outside boundary of portion 44f (shown in dotted lines) and are so located that lines tangential to the circular boundary of portion 44f at points tangential also to the outer rims of each of members 46f, 46f', and 46f" where they touch portion 44f, if extended infinitely, would intersect to form a triangle. The obvious effect of this arrangement is to locate inhibitors around adhering portion 44f in such a pattern as to inhibit parallel movement in any direction of bowl 30f away from base 40f when the same have been brought into a rotatable adhering mode. Obviously, additional protruding members could be added around the periphery of portion 44f, if desired.

Figure 16:
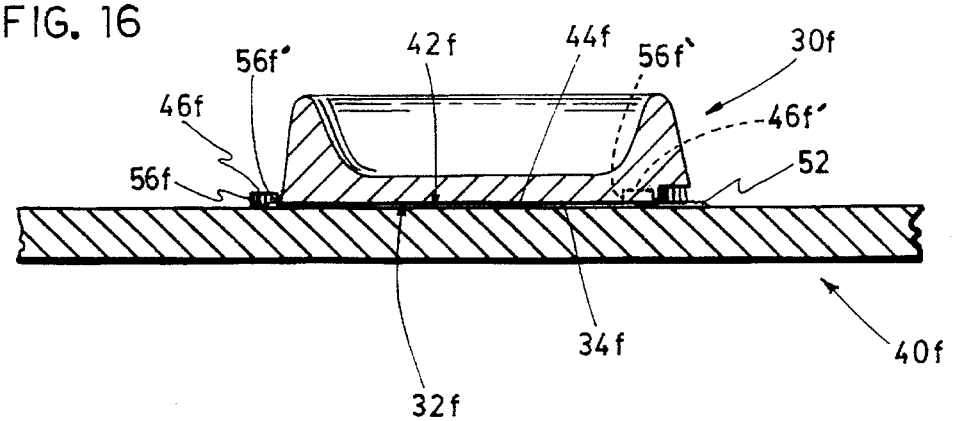
FIG. 16 is an unexploded cross sectional view of embodiment F taken substantially along lines 16—16 of FIG. 15.

Again, portions 34f and 44f are essentially complementary, and, although they are shown in FIGS. 15 and 16 as having matching surfaces that are flat, portion 34f could alternatively be convex and portion 44f correspondingly concave, or the inverse, so long as rotational complementarity essentially obtains. Other rotatably complementary configurations of the contours of these portions are thus obviously possible without altering their essential function, purpose, and/or effectiveness so long as these complementary surface contours are symmetrically concentric around their respective axes.

FIG. 16 is a cross sectional view taken essentially along lines 16—16 of FIG. 15, except that bowl 30f and base 40f are shown fitted together in their rotatable adhering mode rather than juxtaposed, as in the exploded view of FIG. 15. Structure 32f is shown as having been compressed onto structure 42f so that complementary portions 34f and 44f are closely fitted together with liquid film 52 spread thinly between them, thus providing a flowable adhering medium. The outer wall of member 46f forming abutting inhibitor 56f is seen opposing abutting inhibitor 56f', which extends around the bottom edge of bowl 30f. Members 46f' and 46f" carrying abutting inhibitors 56f' and 56f" would be seen to be similarly positioned in relation to inhibitor 56f' if the cross sectional view of FIG. 16 were rotated. In this embodiment of the invention, abutting parallel movement inhibitors 56f, 56f', and 56f", all working reciprocally with abutting inhibitor 56f', thus inhibit any parallel movement of structure 32f away from structure 42f when in a rotatable adhering mode.

Embodiments B through F illustrated in FIGS. 7 through 16 operate and function as previously discussed in respect of the first embodiment illustrated in FIGS. 1 through 5. A quantity of viscous, continuously flowable, non-curing liquid 50 is placed in the approximate center of base adhering structures 42b . . . f after which bowls 30b . . . f are adhered to bases 40b . . . f, preferably by compressively rotating bowls 30b . . . f with their adhering structures 32b . . . f onto adhering structures 42b . . . f of bases 40b . . . f. As this is done, liquid 50 is spread by rotational shear to form liquid film 52 dispersed across the interface between structures 32b . . . f and 42b . . . f. This mobilizes the forces of intermolecular attraction in liquid film 52 to act as an adhering medium by means already discussed. It also positions the film to serve simultaneously as a lubricant by virtue of the shearing properties of the flowable liquid that makes it up, thus lubricatively facilitating rotation of the structures upon each other, when desired.

In their adhering mode, bowl adhering structures 32b . . . f may be rotated on base adhering structure 42b . . . f while remaining adhered, and can only be separated from base adhering structure 42b . . . f by the application of tensile force alone. This results because of the construction, placement, and function of their respective inhibitors. These estop separation by parallel shear force, thus limiting separation to the application of tensile force, which effectively requires a buildup in the energy required to overcome the forces of intermolecular attraction in the liquid, thereby making it more difficult.

Further embodiments G through M of the present rotatable adhering structures are now described in which respective rotatable adhering structures 32 and 42 of bowl 30 and base 40 are modified to incorporate rotatable, non-locking, reciprocally abutting parallel movement inhibitors where one or the other, or both, or all such inhibitors when there are more than two, are formed by curved faces or inclined planes. Thus, instead of presenting essentially vertical opposing faces, as in earlier embodiments, they present opposing faces where at least one is shaped either as a curve, or as a slope, or inclined plane.

The effect of this structure is that, while parallel movement of bowl 30 away from base 40 is still inhibited when lateral force is applied to either bowl or base, lateral movement (as distinct from parallel movement) of one away from the other does become possible in the sense that lateral force applied to bowl 30, for example, will cause it to move obliquely in relation to base 40 as their abutting inhibitors formed by inclined planes slide over or under each other.

Thus, in all the remaining embodiments G through M that follow, applied lateral force is partially converted into vertical force by use of a simple machine, i.e., the inclined plane, to lift the two structures apart. In these embodiments, it would appear that the liquid of liquid film 52 is subjected simultaneously both to shear and to tensile stress until the forces of cohesion and adhesion within the liquid's molecules are overcome.

The practical results are rotatable adhering structures that still cannot be simply slid apart by the application of parallel or shear force alone, but which are nevertheless easier to separate than structures that can only be separated by tensile force. An advantage of these further embodiments is that the amount of force necessary to separate the structures from their adhered state may thus be predetermined and built into the structures at the time of their manufacture. As will be obvious, this may be done by adjusting the angle or cant of the inclined plane, or planes, employed in their design.

In embodiments G–M to be hereinafter described (FIGS. 17–24), adhering structures 32 and 42 are both circular in shape and symmetrical in shape, size, and contour, with the center of their circles being their respective points of symmetry, which is to say that they are symmetrically concentric around their respective axes. Accordingly, FIGS. 17–24 are cross sectional or partial views wherein the plane that is viewed cuts through the center of their symmetrically concentric structures. Further, structures 32 and 42 in embodiments G–M are also approximately complementary in their shapes, sizes, and contours. Moreover, they all incorporate one or more rotatable, non-locking, reciprocally abutting inhibitors in the form either of curved surfaces, or of inclined planes in these contours. Thus, to simplify the description in each case, it is the curved or sloped aspect of the contour that is denoted as an inhibitor, and it is the approximately complementary aspect of its entire face that is denoted as an adhering portion. Finally, since the structures of embodiments G through M may be more easily separated than structures of embodiments A through F, niche 62 and grappling point 64 shown in all earlier embodiments are omitted as being unnecessary in embodiments G through M.

Figure 17:
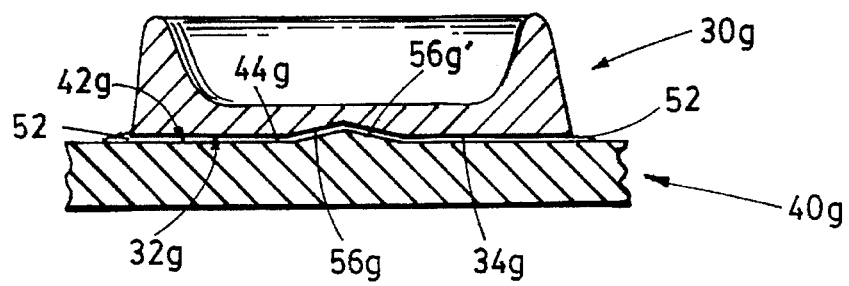
FIG. 17 is a cross sectional view of embodiment G of the adhering structures.

Accordingly, FIG. 17 is a cross sectional representation of embodiment G of the rotatable adhering structures of the present invention. FIG. 17 shows bowl 30g and base 40g and their adhering structures 32g and 42g to be similar to those shown in FIG. 3, except that reciprocally abutting parallel movement inhibitors 56g and 56g' are opposing inclined planes respectively forming the sides of flattened cones rather than opposing vertical faces forming the walls of a circular recess and a circular disk seated therein. Thus, structure 32g in FIG. 17 comprises adhering portion 34g and inhibitor 56g. Conversely, structure 42g comprises adhering portion 44g and reciprocating inhibitor 56g'. Being complementary, structures 32g and 42g are accordingly shown as having been fitted closely together with a thin liquid film 52 spread over their complementary interface.

Figure 18:
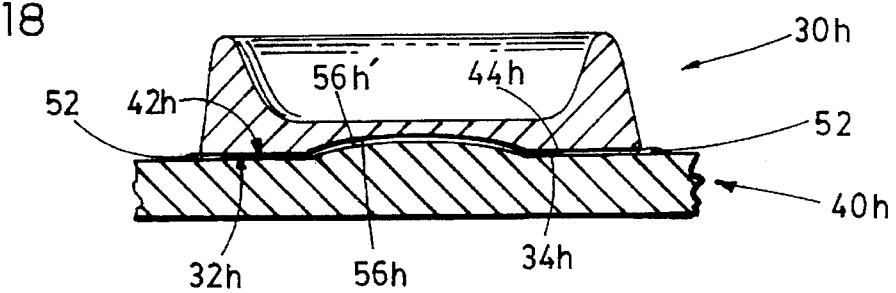
FIG. 18 is a cross sectional view of embodiment H of the adhering structures.

FIG. 18 is a cross sectional view of embodiment H of the present rotatable adhering structures. This view shows bowl 30h and base 40h and their respective adhering structure 32h and 42h to be similar to those shown in FIG. 17 except that reciprocating inhibitors 56h and 56h' are opposing curved faces rather than opposing inclined planes. Structure 32h comprises portion 34h and inhibitor 56h; structure 42h comprises portion 44h and inhibitor 56h'. Structures 32h and 42h are shown closely fitted together in their rotatable adhering mode with film 52 spread between them.

Figure 19:
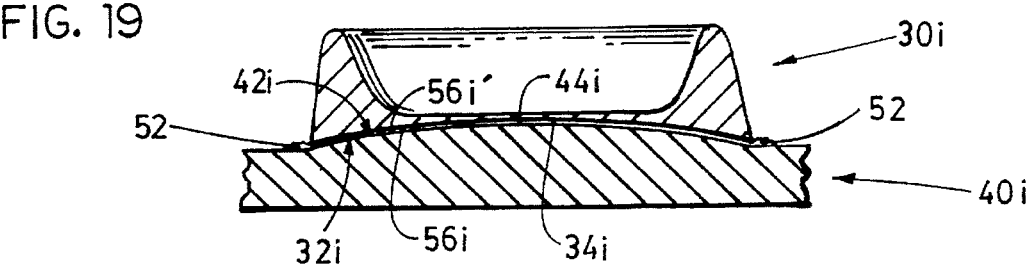
FIG. 19 is a cross sectional view of embodiment I of the adhering structures.

FIG. 19 is a cross sectional view of embodiment I of the rotatable adhering structures. In embodiment I the entire underside of adhering structure 32i of bowl 30i is seen to be a concavity; conversely, complementary structure 42i of base 40i is seen to be a matching convexity. Accordingly, inhibitors 56i and 56i' are provided by the respective opposing curvatures of this concavity and convexity, and adhering portions 34i and 44i are found on their respective complementary faces. Again, structures 32i and 42i are seen in their rotatable adhering mode with film 52 spread across their complementary interface.

Figure 20:
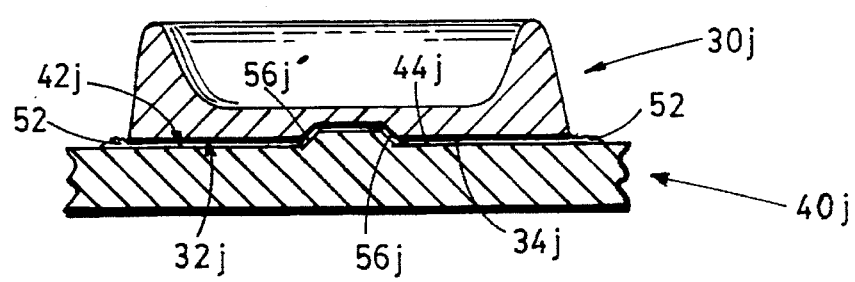
FIG. 20 is a cross sectional view of embodiment J of the adhering structures.

FIG. 20 is a cross sectional view of embodiment J, which is similar to FIGS. 3, except that inhibitors 56j' and 56j are opposing inclined planes. As always, structure 32j comprises portion 34j and inhibitor 56j; structure 42j comprises portion 44j and inhibitor 56j'. FIG. 20 shows bowl 30j and base 40j in their rotatable adhering mode with liquid film 52 spread between structures 32j and 42j.

Figure 21:
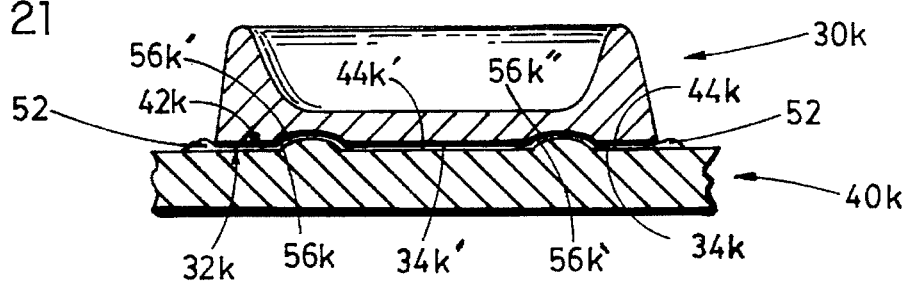
FIG. 21 is a cross sectional view of embodiment K of the adhering structures.

FIG. 21 is a cross sectional view of embodiment K, which is similar to embodiment C shown in FIGS. 9 and 10, except that opposing inhibitors 56k and 56k', as well as opposing inhibitors 56k" and 56k', are curved rather than vertical faces that form the walls of a ring-shaped protrusion and matching recess. As with embodiment C, there could alternatively be a multiplicity of such concentric ring-shaped protrusions and matching recesses providing additional opposing curved inhibiting faces. As with embodiment C, structure 32k of embodiment K comprises portions 34k and 34K' as well as inhibitors 56k and 56k'; structure 42k comprises portions 44k and 44K' as well as inhibitors 56k' and 56k". FIG. 21 shows bowl 30k and base 40k to be in their rotatable adhering mode with film 52 spread between structures 32k and 42k.

Figure 22:
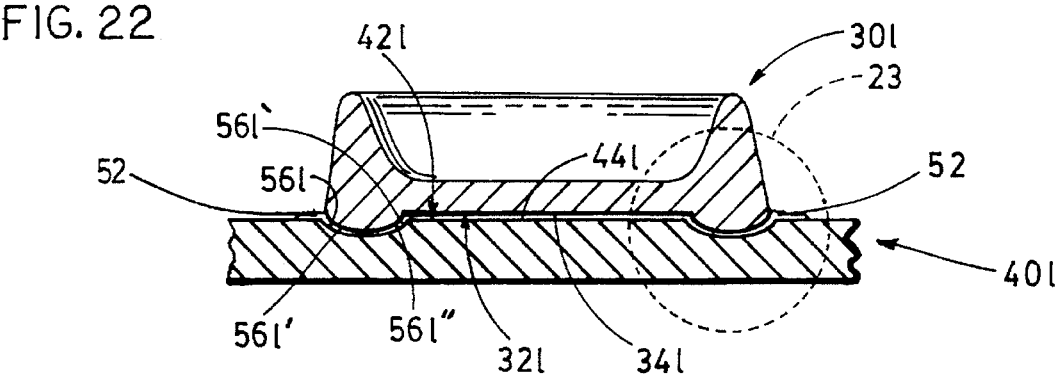
FIG. 22 is a cross sectional view of embodiment L of the adhering structures.

FIG. 22 is a cross sectional view of embodiment L, which is similar to embodiment D shown in FIGS. 11 and 12, except that opposing inhibitors 56l and 56l', as well as opposing inhibitors 56l' and 56l", are opposing curved instead of vertical faces. Structure 32l of bowl 30l comprises portion 34l and inhibitors 56' and 56"; structure 42l of base 40l comprises portion 44l and inhibitors 56l and 56l'. FIG. 22 shows structures 32l and 42l to be pressed together in their rotatable adhering mode with film 52 spread across the complementary interface between them.

Figure 23:
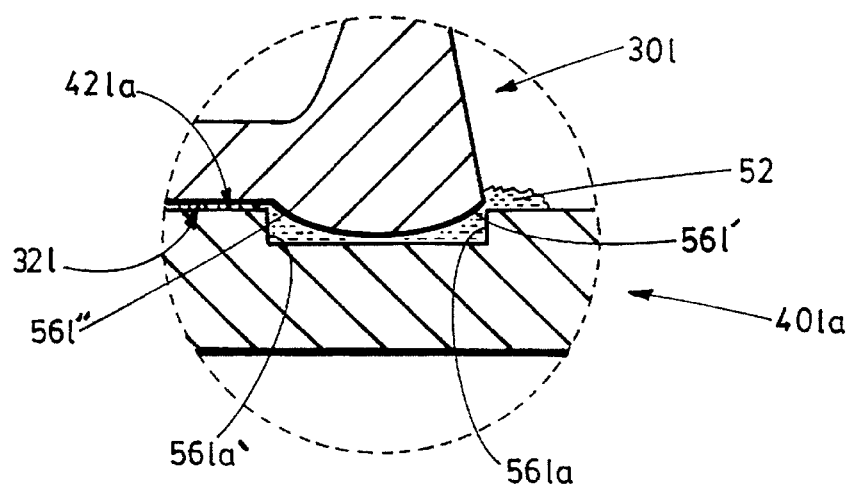
FIG. 23 is an enlarged view of a portion of FIG. 22 showing an alternative structure for parallel movement inhibitors shown in FIG. 22.

FIG. 23 is an enlarged partial cross sectional view taken from FIG. 22 illustrating an alternative arrangement for the inhibitors. In this alternative arrangement, the inhibitors comprised among the elements of base adhering structure 42la are identical to the inhibitors of base adhering structure 42d of FIGS. 11 and 12. Specifically, inhibitors 56la and 56la' remain upright walls or bands virtually identical to inhibitors 56d and 56d' in FIGS. 11 and 12. Thus, an alternative arrangement for the inhibitors in embodiment L is for sloped or curved bowl inhibitors 56l' and 56l" to respectively oppose upright or vertical base inhibitors 56la and 56la', as illustrated in FIG. 23. Functionally, inhibitors 56l' and 56l" still reciprocally oppose inhibitors 56la and 56la' so as to inhibit parallel movement of bowl 30l away from base 40li a. While allowing lateral movement (as distinct from parallel movement), they convert it into oblique movement, which has the effect of forcing the structures apart as liquid film 52 is subjected simultaneously both to shear and to tensile stress.

Figure 24:
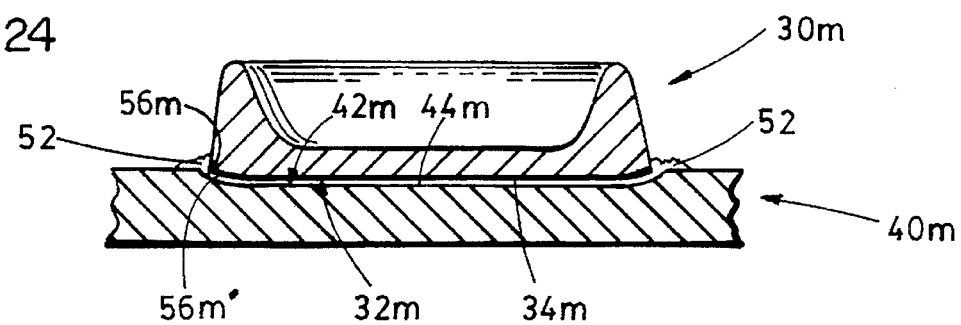
FIG. 24 is a cross sectional view of embodiment M of the adhering structures.

FIG. 24 is a cross sectional view of embodiment M of the present invention, which is similar to embodiment E shown in FIGS. 13 and 14, all essential elements being the same except that inhibitors 56m and 56m' are opposing curved faces instead of opposing vertical bands. Thus, in FIG. 24 structure 32m of bowl 30m comprises portion 34m and inhibitor 56m'; conversely, structure 42m of base 40m comprises portion 44m and inhibitor 56m. Approximately complementary structures 32m and 42m are shown closely fitted together in their rotatable adhering mode with liquid film 52 spread thinly between them.

The structures of embodiments G through M may be adhered in the same manner as the preferred embodiments through F, that is, by placing a quantity of viscous, continuously flowable, non-curing liquid in the approximate center of base adhering structures 42g . . . m and then compressively rotating structures 32g . . . m onto structures 42g . . . m. All structures being circular and symmetrical as well as essentially complementary, this compressive rotational energy spreads the viscous liquid by rotational shear force into a thin liquid film 52 interposed between structures 32g . . . m and 42g . . . m, thus mobilizing the forces of intermolecular attraction that adhere them together as well as providing a lubricating medium to facilitate rotation.

Unadhering structures 32g . . . m and 42g . . . m by tensile force alone remains as difficult as with the preferred embodiments through F. However, unlike embodiments through F, lateral movement (as distinct from parallel movement) of structures 32g . . . m in relation to structures 42g . . . m is possible. When lateral force is therefore applied, the incorporation into structures 32g . . . m and 42g . . . m of inhibitors formed by either curved faces, or inclined planes, or both in combination, means that the energy applied is partially converted into tensile force as the two structures are simultaneously slid and pulled apart as they slide over or under each other on curved faces or inclined planes. In short, the inhibitors of structures 32g . . . m and 42g . . . m continue to inhibit parallel movement of one structure away from the other, but do not estop lateral movement, which is converted into oblique movement between the structures and which causes them to separate by subjecting the intervening liquid film both to shear stress and to tensile stress. While unadhering is thus made easier than in embodiments through F, it is still inhibited by the inhibitors of the invention, which effectively make separation more difficult than would be the case if the adhering portions of the structures could simply be slid apart in the direction of their parallel planes.

Once again, an advantage of embodiments G through M, is that, by adjusting the angle of the inclined planes in each of the inhibitors, or in the curvature of their curves, the energy required to separate them may be predetermined and incorporated into the designs of the various products represented by bowl 30 and base 40. For certain uses and applications, this could be very desirable.

It will be clear, too, that all embodiments of the invention herein described are only illustrative of the numerous combinations and variations in contour, size, and shape of essentially complementary rotatable adhering surfaces and parallel movement inhibitors—as well as of their relative positions in relation to each other—that may be devised to produce rotatable adhering structures as subsequently set forth in the claims of the present invention.

Specifically, the rotatable adhering structures of the present invention have an advantage in controllably and releasably and rotatably adhering a variety of manufactured objects together in that they provide structure for effectively employing and controlling the adhering, cohering, and lubricating properties of viscous, continuously flowable, non-curing liquids, including many ordinary household liquids, to effect rotatable adherence;

the objects adhered may be rotated in relation to each other while remaining adhered;

the adhering structures avoid the use of magnets, suction devices, springs, clamps, snaps, catches, and other such gadgetry that may be difficult to use, suffer from deterioration, and may be dangerous for small children;

they are uncomplicated to understand, simple and safe to use, easy to clean, and inexpensive to manufacture;

the rotatable adhering structures may generally be stamped, molded, pressed, shaped, formed, or otherwise produced of the same materials or combinations of materials of which the items to be adhered are made;

the invention may be realized in a multiplicity of different embodiments by which the ease of adhering and the difficulty of unadhering may be differentially incorporated into a variety of alternative embodiments at the time of their manufacture.

Although the descriptions herein set forth of the various embodiments of the invention contain many specificities, these should not be construed as limiting the scope of the invention but merely as providing illustrations of some of its many possible alternative embodiments.

Thus the scope of the invention should be determined by the appended claims and their legal equivalents, rather than by the examples given.

I claim:

1. A pair of adhering structures for employing both the shearing properties and the forces of intermolecular attraction in a viscous, continuously flowable, non-curing liquid to rotatably, controllably, and releasably adhere two manufactured objects together, each said adhering structure being integral to each of two manufactured objects to be rotatably, controllably, and releasably adhered together, each said adhering structure comprising:

(a) an adhering surface portion of predetermined size integral to said adhering structure, said portion having a surface contour that is symmetrically concentric around its axis and essentially complementary in size and shape to the other said portion of the other said adhering structure, whereby said portion of one said adhering structure may be reciprocally fitted to and rotated upon the other said portion of the other said adhering structure around their respective axes without breaking a common complementary interface;

(b) integral to each said adhering structure: rotatable, non-locking, parallel movement inhibiting abutment means for reciprocally abutting said abutment means of the other said adhering structure to inhibit movement of one said portion way from the other said portion in a direction parallel to their imaginary planes when said portions have been reciprocally fitted together, said abutment means uninhibitedly permitting rotation upon each other of said portions and uninhibitedly permitting separation of said portions by tensile force acting in a direction perpendicular to their imaginary planes when fitted together;

whereby said portions, when reciprocally fitted together, may mobilize, within a predetermined range of temperatures, the forces both of intermolecular attraction in, and the shearing and lubricating properties of, a film of a viscous, continuously flowable, non-curing liquid when spread intermediately between said portions across said common complementary interface, whereby said portions may lubricatively rotatably adhere to said film of said viscous, continuously flowable, non-curing liquid as a flowable adhering medium and thereby lubricatively rotatably adhere to each other; whereby said adhering structures to which said portions are integral may be adhered to each other in location, lubricatively rotated upon each other while remaining adhered in location, inhibited from being slid apart by shear force acting in a direction parallel to the imaginary planes of said portions when lubricatively rotatably adhered, and optionally separated from each other by a tensile force sufficient to break the bonds of intermolecular attraction mobilized between them when lubricatively rotatably adhered; whereby the two said manufactured objects to the each of which each of said adhering structures is integral may be rotatably, controllably, and releasably adhered together.

2. The adhering structures of claim 1 wherein one said adhering structure additionally carries a grappling point, whereby said grappling point may be grappled to facilitate separation of one said adhering structure from the other.

3. The adhering structures of claim 1, further comprising two manufactured objects, wherein one of said two manufactured objects is a supporting base and the other of said two manufactured objects is a holder.

4. The adhering structures of claim 3 wherein said holder carries around its outside periphery an endless containing wall of predetermined height.

5. The adhering structures of claim 4 wherein said wall carries an inside surface, an outside surface, and a crest, said inside and said outside surfaces being anticlinal from said crest.

6. A composite device rotatably, controllably, and releasably adhering two manufactured objects together, said composite device comprising:

(a) a pair of adhering structures supporting and connecting other elements of said composite device, each said adhering structure being integral to one of two said manufactured objects;

(b) a pair of adhering surface portions of predetermined size, each of said portions being integral to each of said adhering structures, said portions being essentially complementary to each other in size and shape, said portions having complementary surface contours that are symmetrically concentric around their respective axes, whereby said portions may be reciprocally fitted together upon a complementary interface and rotated upon each other around their respective axes while maintaining said complementary interface;

(c) a viscous, continuously flowable, non-curing liquid spread within a predetermined range of temperatures intermediately across said complementary interface of said portions reciprocally fitted together, said viscous, continuously flowable, non-curing liquid serving simultaneously as a lubricant and as a flowable adhering medium intermediate said portions, whereby said portions are adhered and may be lubricatively rotated upon each other while remaining adhered by the forces of intermolecular attraction in said viscous, continuously flowable, non-curing liquid;

(d) integral to each said adhering structure: rotatable, non-locking, parallel movement inhibiting abutment means for reciprocally abutting each other to inhibit parallel movement of rotatably adhered said portions away from each other in a direction parallel to their imaginary planes, said abutment means uninhibitedly permitting rotation of said portions upon each other and uninhibitedly permitting said portions to be separated from each other in a direction perpendicular to their imaginary planes;

whereby said portions are rotatably adhered together by the forces of intermolecular attraction in said viscous, continuously flowable, non-curing liquid spread intermediately across said complementary interface; whereby rotation of said portions upon each other while remaining adhered is lubricatively facilitated by the shearing properties of said viscous, continuously flowable, non-curing liquid; and whereby lubricatively rotatably adhered said portions are inhibited by said abutment means from being slid apart by shear force while being optionally, separable from each other by a tensile force sufficient to break the bonds of intermolecular attraction in said viscous, continuously flowable, non-curing liquid.

7. The composite device of claim 6 wherein one said adhering structure carries a grappling point, whereby one said adhering structure of one said manufactured object may be grappled for disengagement from the other.

8. The composite device of claim 6 wherein one said adhering structure is integral to a supporting base and the other said adhering structure is integral to a holder, said base and said holder constituting two said manufactured objects.

9. The composite device according to claim 8 in which said holder carries around its outside periphery an endless containing wall of predetermined height.

10. The composite device according to claim 9 in which said endless containing wall carries an inside surface, an outside surface, and a crest, said inside and outside surfaces being anticlinal from said crest.

11. The method of using, within a predetermined range of temperatures, a viscous, continuously flowable, non-curing liquid to lubricatively, rotatably, and controllably adhere two reciprocally matching surface portions of two manufactured objects to each other, wherein each said surface portion has a surface contour that is symmetrically concentric around its axis and essentially complementary in size and shape to said surface contour of the other said surface portion whereby said surface portions may be reciprocally fitted together and rotated upon a continuously complementary interface, and wherein said two manufactured objects carry rotatable, non-locking, reciprocally abutting, parallel movement inhibiting abutment means for inhibiting movement of said surface portions away from each other in a direction parallel to their imaginary planes when reciprocally fitted together, said abutment means uninhibitedly permitting rotation of said surface portions upon each other when fitted reciprocally together and uninhibitedly permitting their separation by tensile force acting in a direction perpendicular to their imaginary planes;

said method comprising the steps of (1) spreading said viscous, continuously flowable, non-curing liquid across either or both of said surface portions, and (2) compressing said surface portions of said two manufactured objects together with said viscous, continuously flowable, non-curing liquid intermediate said surface portions upon their said continuously complementary interface;

whereby said surface portions of said two manufactured objects may be adhered by virtue of the forces of intermolecular attraction in said viscous, continuously flowable, non-curing liquid spread intermediately between them; whereby rotation of said surface portions while remaining adhered are lubricatively facilitated by virtue of the shearing properties of said viscous, continuously flowable, non-curing liquid, said surface portions, when lubricatively rotatably adhered, being inhibited by said abutment means from sliding apart in a direction parallel to their imaginary planes while remaining separable by tensile force acting in a direction perpendicular to their imaginary planes.

12. The method of claim 11 comprising the further step of separating rotatably adhered said two manufactured objects from each other by applying tensile force to either of said two manufactured objects, said tensile force being of sufficient strength to overcome the forces of intermolecular attraction in said viscous, continuously flowable, non-curing liquid spread across said continuously complementary interface, whereby said two manufactured objects may optionally be separated from each other.

13. A method for rotatably, controllably, and releasably adhering two manufactured objects together, said method comprising the following steps:

(a) providing each of two manufactured objects with an adhering surface portion of predetermined size, said portion being complementary in size and shape to said portion of the other of two said manufactured objects, each said portion having a surface contour that is symmetrically concentric around its axis, each said surface contour being essentially complementary to the other said surface contour, whereby said portion of one of two said manufactured objects may be reciprocally fitted to said portion of the other of two said manufactured objects upon a complementary interface and the two said portions rotated upon each other while maintaining said complementary interface;

(b) providing each of two said manufactured objects with rotatable, non-locking, parallel movement inhibiting abutment means for reciprocally abutting each other to inhibit parallel movement of said manufactured objects away from each other in a direction parallel to the imaginary planes of their said portions when the same have been reciprocally fitted together, said abutment means uninhibitedly permitting said manufactured objects to be separated by tensile force acting in a direction perpendicular to the imaginary planes of said portions when fitted together, whereby said manufactured objects when fitted together are inhibited from being slid apart in a direction parallel to the imaginary planes of their said portions but are uninhibited from be separated in a direction perpendicular to the imaginary planes of their said portions;

(c) spreading a viscous, continuously flowable, non-curing liquid within a predetermined range of temperatures across one or both of said portions of said manufactured objects;

(d) fitting one said portion reciprocally to the other said portion and compressing them upon each other with said liquid spread across said complementary interface intermediate said portions;

whereby said liquid lubricatively facilitates rotation of said portions of said manufactured objects upon each other by virtue of the shearing properties of said liquid while simultaneously adhering said portions together during rotation by virtue of the forces of intermolecular attraction in said liquid, whereby said manufactured objects may be rotated upon each other while remaining controllably and releasably adhered but inhibited from being slid apart by shear force acting in a direction parallel to the imaginary planes of their said portions.

14. The method of claim 13 comprising the further step of providing one of said manufactured objects with a grappling point, said grappling point for accepting a tensile force sufficient to overcome the forces of intermolecular attraction in said liquid spread across said complementary interface, whereby said manufactured objects may optionally be separated from each other.

15. The method of claim 14 comprising the further step of grappling said grappling point and lifting by tensile force one said manufactured object from the other.

* * * * *